(12) United States Patent
Lin et al.

(10) Patent No.: US 9,128,269 B1
(45) Date of Patent: Sep. 8, 2015

(54) LENS ARRAY

(71) Applicant: HIMAX TECHNOLOGIES LIMITED, Tainan (TW)

(72) Inventors: Han-Ching Lin, Tainan (TW); Chuan-Hui Yang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 7 days.

(21) Appl. No.: 14/185,022

(22) Filed: Feb. 20, 2014

(51) Int. Cl.
G02B 27/10 (2006.01)
G02B 13/00 (2006.01)
G02B 3/00 (2006.01)

(52) U.S. Cl.
CPC .......... *G02B 13/0085* (2013.01); *G02B 3/0062* (2013.01); *G02B 13/003* (2013.01)

(58) Field of Classification Search
CPC ............... G02B 3/0068; G02B 3/0006; G02B 13/0055; G02B 13/006; G02B 13/0085
See application file for complete search history.

(56) References Cited

U.S. PATENT DOCUMENTS

| | | | | |
|---|---|---|---|---|
| 8,385,007 B2 * | 2/2013 | Yang | | 359/717 |
| 8,547,648 B2 * | 10/2013 | Yang et al. | | 359/718 |
| 8,582,220 B2 * | 11/2013 | Yang | | 359/793 |
| 8,625,210 B2 * | 1/2014 | Tang et al. | | 359/795 |
| 8,842,381 B2 * | 9/2014 | Yang | | 359/793 |
| 8,861,096 B2 * | 10/2014 | Yang | | 359/715 |
| 2010/0309368 A1 * | 12/2010 | Choi et al. | | 348/360 |

* cited by examiner

*Primary Examiner* — David N Spector
(74) *Attorney, Agent, or Firm* — McClure, Qualey & Rodack, LLP

(57) ABSTRACT

A lens array includes a plurality of micro-lens modules. Each of the micro-lens modules includes a first lens group and a second lens group. The first lens group and the second lens group are arranged sequentially from an object side to an image side along an optical axis. An effective focal length (EFL) of the first lens group is f1, an EFL of the second lens group is f2, and the micro-lens modules satisfy a following condition: −0.2<f1/f2<0.5.

18 Claims, 28 Drawing Sheets

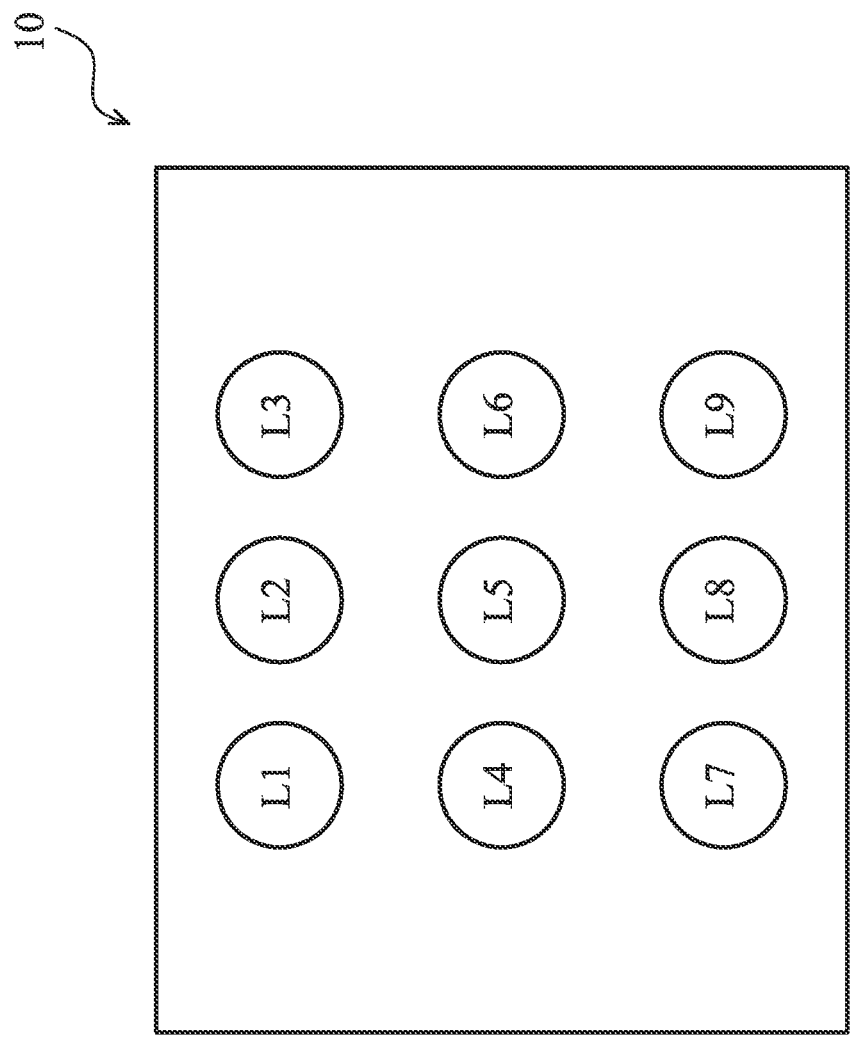

LENS ARRAY

BACKGROUND OF THE INVENTION

1. Field of the Invention

The present invention relates to lens array, and in particular to the aspheric surfaces of first and second micro-lens modules of the lens array not being the same.

2. Description of the Related Art

A conventional lens array delivers the light of different wavelengths to an image sensor. By processing the light of different wavelengths received by the image sensor, the resolution and depth of field can be improved. However, as the light of different wavelengths passes through the lens array having a different refractive power, the axial aberration grows worse. Thus, improvements to the design of lens arrays are needed.

BRIEF SUMMARY OF THE INVENTION

A detailed description is given in the following embodiments with reference to the accompanying drawings.

An embodiment of the present invention discloses a lens array. A lens array includes a plurality of micro-lens modules. Each of the micro-lens modules includes a first lens group and a second lens group. The first lens group and the second lens group are arranged sequentially from an object side to an image side along an optical axis. An effective focal length (EFL) of the first lens group is f1, an EFL of the second lens group is f2, and the micro-lens modules satisfy a following condition: $-0.2 < f1/f2 < 0.5$.

An embodiment of the present invention discloses a lens array. The lens array includes first and second micro-lens modules. Each of the first and second micro-lens modules includes a first lens group having a first aspheric surface. A radius of curvature of the first aspheric surface of the first micro-lens module is different from a radius of curvature of the first aspheric surface of the second micro-lens module.

An embodiment of the present invention discloses a lens array. The lens array includes first, second and third micro-lens modules. Each of the first, second and third micro-lens modules includes a first lens group and a second lens group. The first lens group has a first aspheric surface. The first lens group and the second lens group are arranged sequentially from an object side to an image side along an optical axis, radiuses of curvature of the first aspheric surfaces of the first, second and third micro-lens modules are different, and the first, second and third micro-lens modules satisfy $-0.2 <$ (an EFL of the first lens group)/(an EFL of the second lens group) $< 0.5$.

BRIEF DESCRIPTION OF THE DRAWINGS

The present invention can be more fully understood by reading the subsequent detailed description and examples with references made to the accompanying drawings, wherein:

FIG. 1A is schematic diagram of a lens array according an embodiment of the present invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIG. 1A is a schematic diagram of a lens array according to an embodiment of the invention. As shown in FIG. 1A, the lens array 10 has a plurality of micro-lens modules L1-L9. It should be noted that the number of micro-lens modules can be modified if needed. In an embodiment, the lens array is configured to receive an image (i.e. the light) of the object and pass the image to the image sensor.

Figure 1B:
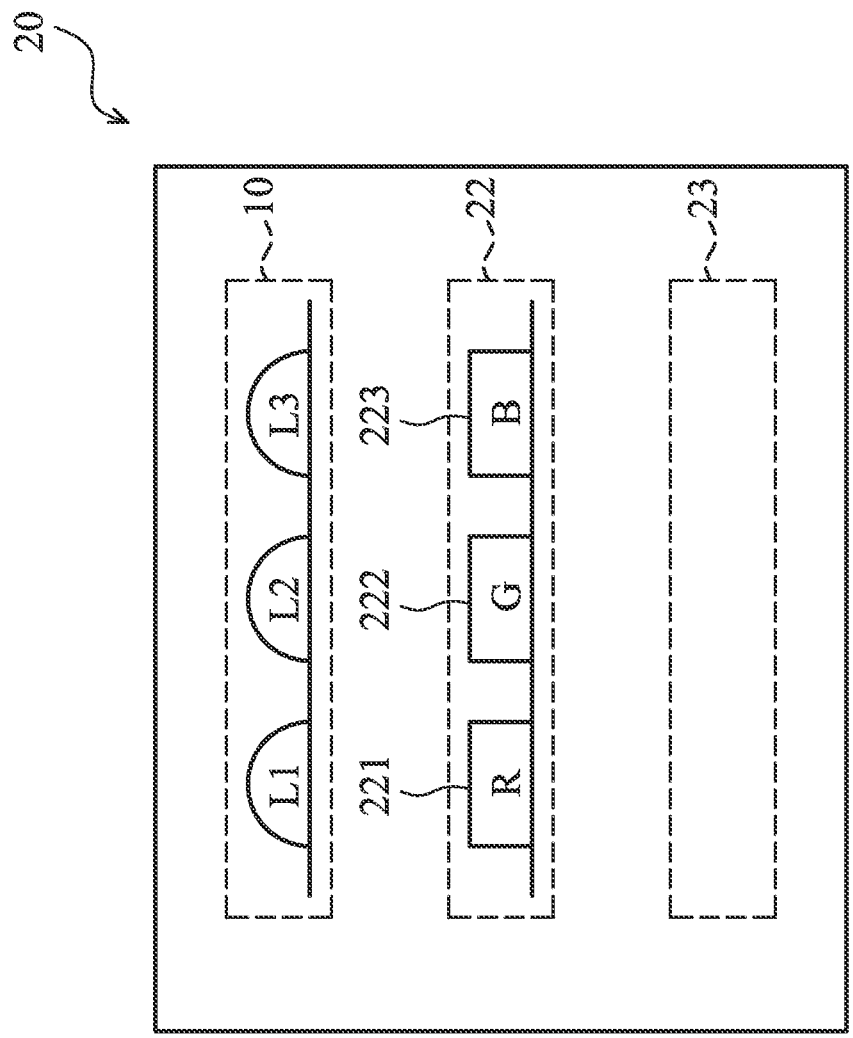
FIG. 1B is schematic diagram of a lens array system according an embodiment of the present invention.

FIG. 1B is a schematic diagram of a lens array system according to an embodiment of the invention. As shown in FIG. 1B, the lens array system 20 includes the lens array 10, a color-filter layer 22 and an image sensor 23. The color-filter layer 22 is a band-pass filter for passing a light of a specified wavelength. For example, the color-filter 221 is configured to pass the light of wavelengths located between 570 nm and 650 nm (i.e. red light). The color-filter 222 is configured to pass the light of wavelengths located between 490 nm and 570 nm (i.e. green light). The color-filter 223 is configured to pass the light of wavelengths located between 410 nm and 490 nm (i.e. blue light). The image sensor 23 is arranged to sense images. In the present embodiment, the image sensor 23 can be a charge coupled device (CCD), or a complementary metal-oxide-semiconductor (CMOS) sensor, but it is not limited thereto.

Figure 2A:
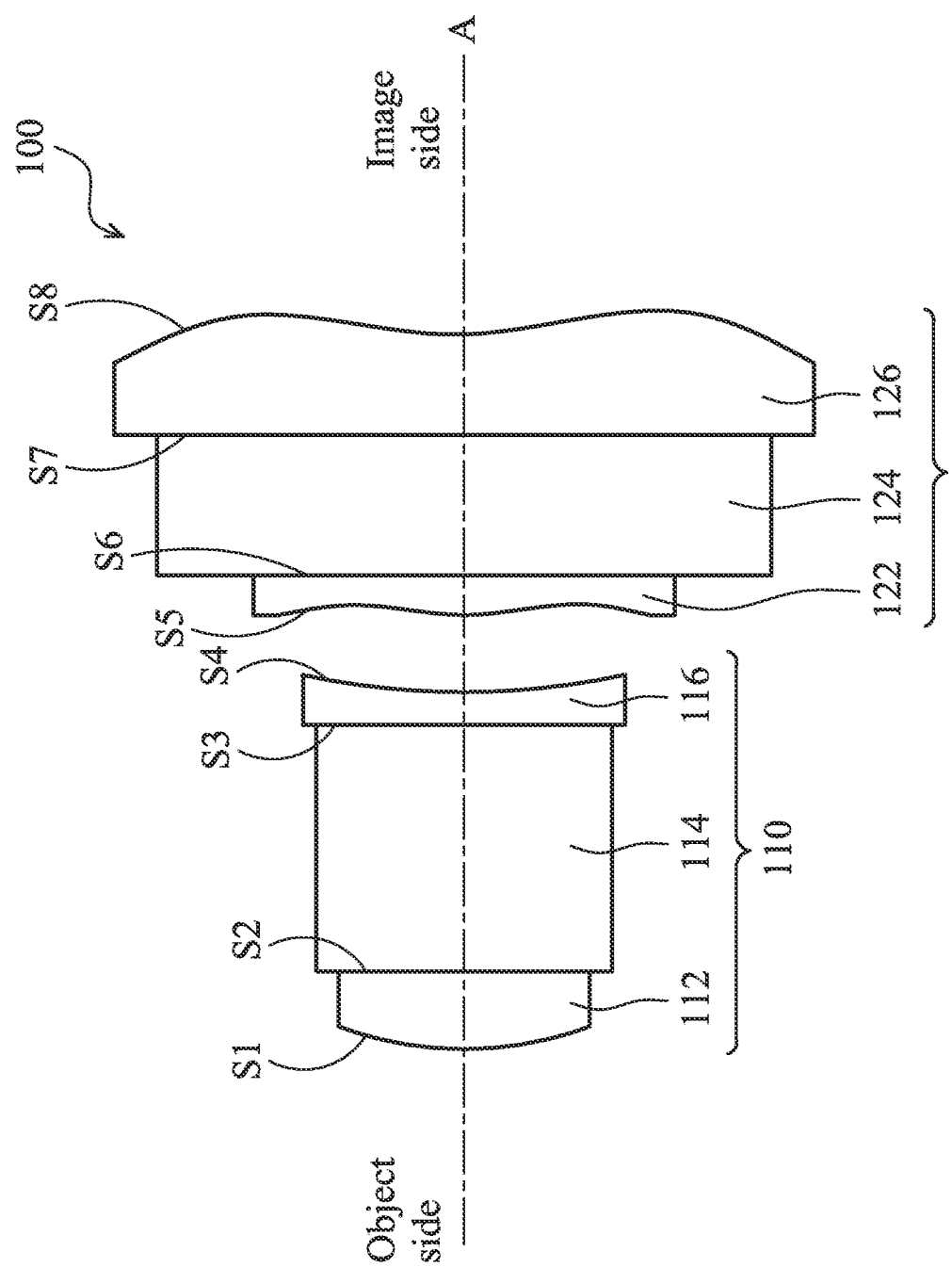
FIG. 2A is schematic diagram of a micro-lens module according an embodiment of the present invention.

Please refer to FIG. 2A. FIG. 2A is a structural diagram of a micro-lens module of the lens array 10 according to an embodiment of the invention. As shown in FIG. 2A, the micro-lens module 100 includes a first lens group 110 and a second lens group 120, but it is not limited thereto. In the present embodiment, the first lens group 110 and the second lens group 120 are sequentially disposed from an object side to an image side along the optical axis A.

In the present embodiment, the first lens group 110 and/or the second lens group 120 include a plurality of lenses, but it is not limited thereto. Specifically, the first lens group 110 comprises a first lens 112, a first flat lens 114 and a second lens 116 sequentially arranged from the object side to the image side along the optical axis A. The first lens group 110 comprises a first lens 112, a first flat lens 114 and a second lens 116 sequentially arranged from the object side to the image side along the optical axis, but it is not limited thereto. The second lens group 120 includes a third lens 122, a second flat lens 124 and a fourth lens 126 sequentially arranged from the object side to the image side along the optical axis, but it is not limited thereto.

Furthermore, a surface S1 of the first lens 112 facing the object side is the first aspheric surface. A surface S2 of the first lens 112 faces the image side and leans against a plane of the first flat lens 114. A surface S3 of the second lens 116 faces the object side and leans against an opposite plane of the first flat lens 114. A surface S4 of the second lens 112 facing the image side is the second aspheric surface. Namely, the first aspheric surface (S1) is closest to the object side in the first lens group 110. The second aspheric surface (S4) is closest to the image side in the first lens group 110.

Similarly, a surface S5 of the second lens 122 facing the object side is the third aspheric surface. A surface S6 of the second lens 122 faces the image side and leans against a plane of the second flat lens 124. A surface S7 of the fourth lens 126 faces the object side and leans against an opposite plane of the second flat lens 124. A surface S8 of the fourth lens 126 facing the image side is the fourth aspheric surface. Namely, the third aspheric surface (S5) is closest to the object side in the second lens group 120. The fourth aspheric surface (S8) is closest to the image side in the second lens group 120.

In the present embodiment, an effective focal length (EFL) of the first lens group is f1, and an effective focal length of the second lens group is f2. In order to assure the optical image quality, the micro-lens satisfies the following condition: $-0.2<f1/f2<0.5$. In one embodiment, a reflective index of the first flat lens 114 is between 1.5 and 1.6, and an Abbe number of the first flat lens 114 is between 45 and 65. A reflective index of the second flat lens 124 is between 1.5 and 1.6, and an Abbe number of the second flat lens 124 is between 45 and 65.

Figure 2B:
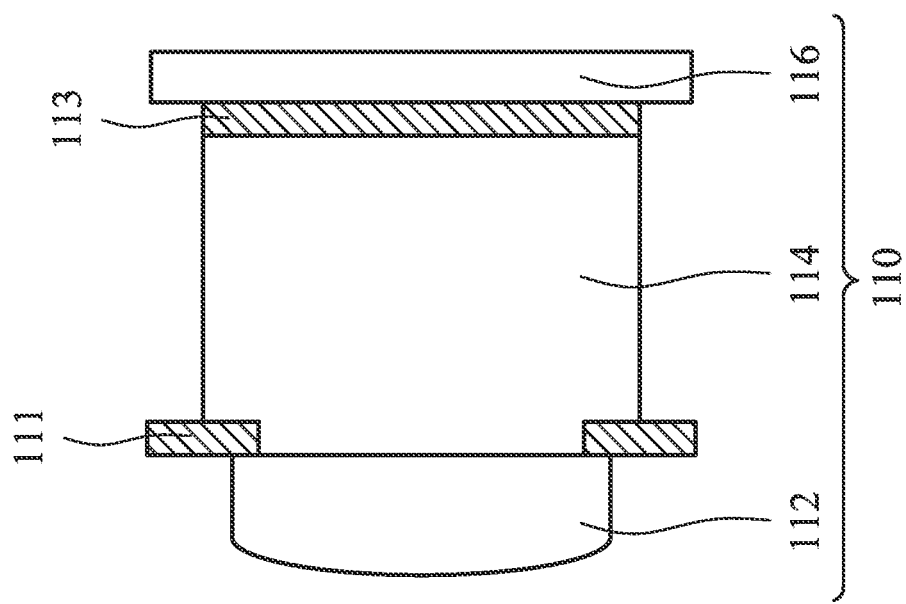
FIG. 2B is schematic diagram of another micro-lens module according an embodiment of the present invention.

As shown in FIG. 2B, in an embodiment, the first lens group 110 further includes an aperture stop 111 and an infrared (IR) filter 113. The aperture stop 111 and the infrared filter 113 can be disposed selectively on one plane of the first flat lens 114. The aperture stop 111 is configured to determine the amount of light reaching the image sensor, and the infrared filter 113 is configured to block unwanted infrared light therein. Both the aperture stop 111 and the infrared filter 113 can be formed on the surfaces of the lenses or on the first flat lens by coating. In the present exemplary embodiment, the aperture stop 111 is disposed on the plane of the first flat lens 114 facing the surface S2. The infrared filter 113 is disposed optionally on at least one plane of the first flat lens 114. Herein, the infrared filter 113 disposed on the plane of the first transparent flat lens 114 facing the surface S3 is exemplary for description, but it is not limited thereto. In another embodiment, the infrared filter 113 may also be disposed on the plane of the first transparent flat lens 114 facing the surface S2. In another embodiment, the aperture stop 111 and the infrared filter 113 can also be disposed selectively on one plane of the second flat lens 124.

Please refer to FIG. 1B, in the present embodiment, the first aspheric surface of the first micro-lens module L1 is different from the first aspheric surface of the second micro-lens module L2. For example, the radius of curvature of the first aspheric surface of the first micro-lens module L1 is different from the radius of curvature of the first aspheric surface of the second micro-lens module L2.

In the present embodiment, the first lens group of the first micro-lens module L1 is configured to deliver a first light of a first wavelength to the image sensor 23, and the first lens group of the first micro-lens module L1 has a first focal length corresponding to the first light. Similarly, the second micro-lens module L2 is configured to deliver a second light of a second wavelength to the image sensor 23, the first lens group of the second micro-lens module L2 has a second focal length corresponding to the second light. In the present embodiment, the first wavelength is different from the second wavelength, and the first focal length is equal to the second focal length.

Specifically, the first light and the second light have the same focal plane when the first light and the second light respectively pass through the first micro-lens module L1 and the second micro-lens module L2. Namely, the refractive indexes of the first light and the second light are the same when the first and second light are received by the lens array 10 and delivered to the image sensor 23. Thus, the axial aberration of the first and second light can be improved.

In another embodiment (as shown in FIG. 1B), the lens array 10 includes a first micro-lens module L1, a second micro-lens module L2 and a third micro-lens module L3. The first, second and third micro-lens modules L1, L2 and L3 are configured respectively to deliver the first, second and third light to the image sensor 23. In the present embodiment, the first light is red light and the wavelength of the first light is between 570 nm and 650 nm. The second light is green light and the wavelength of the second light is between 490 nm and 570 nm. The third light is blue light and the wavelength of the third light is between 410 nm and 490 nm. In the present embodiment, the refractive indexes of the first light, the second light and the third light are the same when the first, second and third light are all received by the lens array 10 and delivered to the image sensor 23. Thus, the axial aberration of the red light, green light and blue light can be improved.

An embodiment of the lens array 10 is provided below. It should be noted that data listed in the following tables are not used to limit the invention, and those skilled in the art can suitably change the parameters or settings therein without departing from the scope of the invention.

In the first embodiment, the total track is 2.33 and the image space F/# (F-number) is 3. In the present embodiment, the lens array 10 includes the first, second and third micro-lens modules L1-L3, but it is not limited thereto. Furthermore, at least one of the aspheric surfaces of the first, second and third micro-lens modules L1-L3 has a different radius of curvature. More specifically, the aspheric surfaces S1 of the first, second and third micro-lens modules L1-L3 are different from one another, but it is not limited thereto. The first embodiment of the lens array 10 in accordance with the present invention presents the following data:

TABLE 1-1

Total Track:2.33 Image Space F/#:3

| Surface | Radius of curvature (mm) | Distance (mm) | Index of Refraction | Abbe Number | Notes |
|---|---|---|---|---|---|
| S1 | Table 1-2 | 0.23 | 1.57 | 31.4 | first lens |
| S2 | Infinity | 0.7 | 1.51 | 61.6 | first flat lens |
| S3 | Infinity | 0.08 | 1.57 | 31.4 | second lens |
| S4 | 1.62 | 0.14 | air | | |
| S5 | 1.5 | 0.1 | 1.57 | 31.4 | third lens |
| S6 | Infinity | 0.4 | 1.51 | 61.6 | second flat lens |
| S7 | Infinity | 0.3 | 1.57 | 31.4 | |
| S8 | 1.86 | 0.38 | air | | fourth lens |

TABLE 1-2

| micro-lens module | Surface | Radius of curvature (mm) |
|---|---|---|
| first | S1 | 0.929452 |
| second | S1 | 0.918828 |
| third | S1 | 0.939387 |

In Table 1-1, the distance refers to a linear distance along the optical axis A between two neighboring surfaces. For example, the distance of surface S3 is the linear distance along the optical axis A between surface S3 and surface S4.

coefficient $\alpha_2$-$\alpha_8$ of the surfaces S4, S5 and S8 are listed in Table 2-1, and the coefficient $\alpha_2$-$\alpha_8$ of the surface S1 of the first, second and third micro-lens modules are listed in Table 2-2.

TABLE 2-1

| Aspheric Surface Parameter | conic constant K | $\alpha_2$ | $\alpha_3$ | $\alpha_4$ |
|---|---|---|---|---|
| S4 | −34.78 | 0.55987102 | −31.953668 | 740.4121 |
| S5 | −3.95 | 0.60220976 | −27.36823 | 471.1944 |
| S8 | 0.37 | 0.1670655 | −3.3762561 | 10.7816 |

| Aspheric Surface Parameter | $\alpha_5$ | $\alpha_6$ | $\alpha_7$ | $\alpha_8$ |
|---|---|---|---|---|
| S4 | −7695.287 | 30339.487 | 38258.276 | −404147 |
| S5 | −4669.79 | 22587.267 | −41889.151 | −25045.4 |
| S8 | −19.38503 | 15.801591 | −2.5293723 | −2.69172 |

TABLE 2-2

| micro-lens module | Aspheric Surface Parameter | conic constant K | $\alpha_2$ | $\alpha_3$ | $\alpha_4$ |
|---|---|---|---|---|---|
| first | S1 | −39.2977 | 6.657865 | −134.038 | 2112.167 |
| second | S1 | −56.7945 | 7.810553 | −151.272 | 2205.249 |
| third | S1 | −58.4931 | 7.613879 | −147.087 | 2142.706 |

| micro-lens module | Aspheric Surface Parameter | $\alpha_5$ | $\alpha_6$ | $\alpha_7$ | $\alpha_8$ |
|---|---|---|---|---|---|
| first | S1 | −20065.1 | 100616 | −203346 | −3530.4 |
| second | S1 | −20171.3 | 104799.5 | −263452 | 201515.1 |
| third | S1 | −19408.8 | 96862.31 | −213232 | 73574.19 |

The total track refers to the total distance from the surface S1 to the surface S8. The distance, index of refraction, and Abbe number corresponding to each of the lenses listed in the "Notes" column can be found in the corresponding values for the distance, index of refraction, and Abbe number from each row. Moreover, in Table 1-1, surfaces S1 and S2 are two surfaces of the first lens 112; surfaces S3 and S4 are two surfaces of the second lens 116; surfaces S5 and S6 are two surfaces of the third lens 122; surfaces S7 and S8 are two surfaces of the fourth lens 126. The radius of curvature, the distance, and other parameters are shown in Table 1, and the details thereof are omitted for brevity.

Figure 3A:
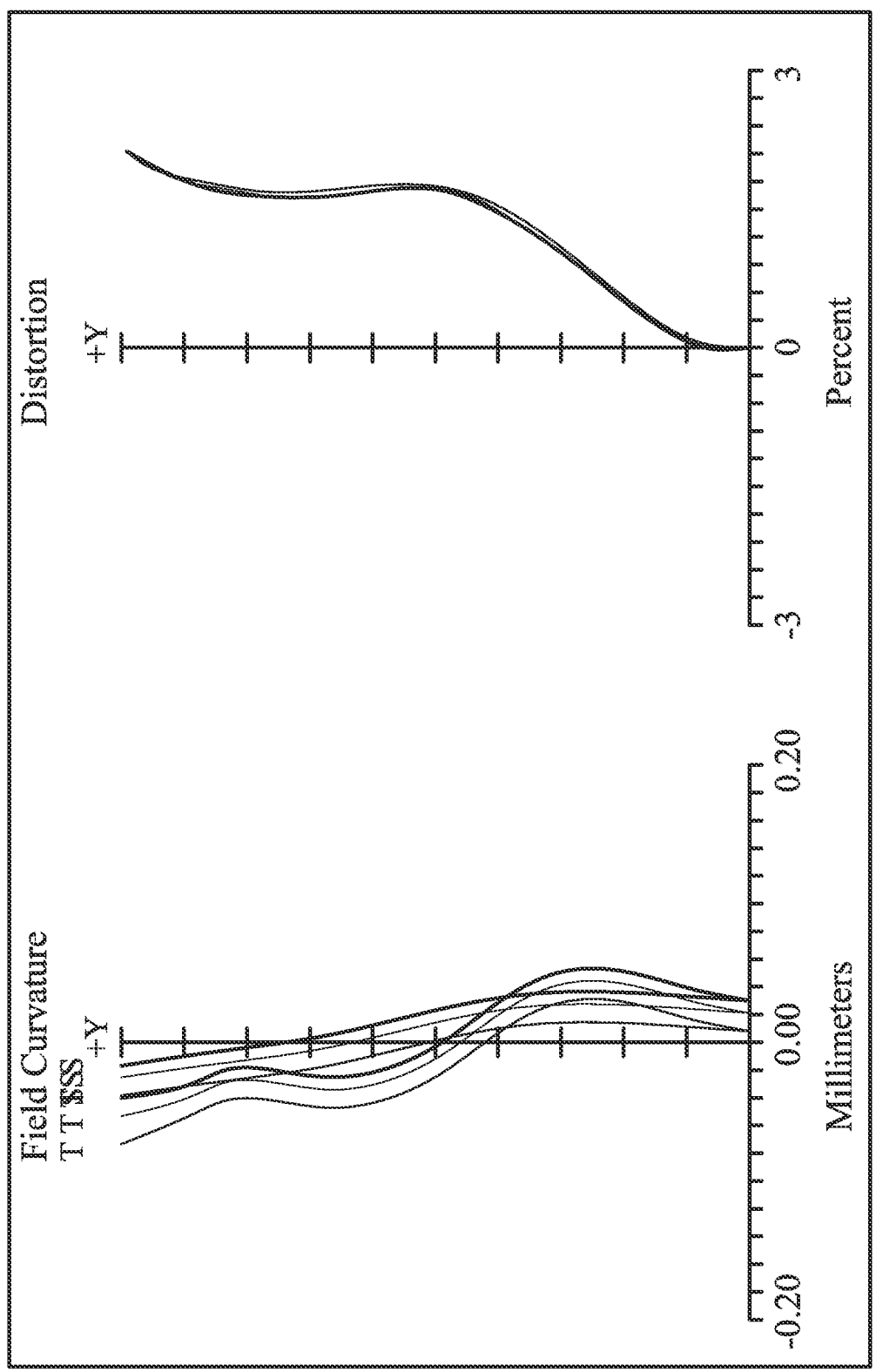
FIGS. 3A-3C and 4A-4C are simulation data diagrams of the lens array according another embodiment of the present invention.
Figure 3B:
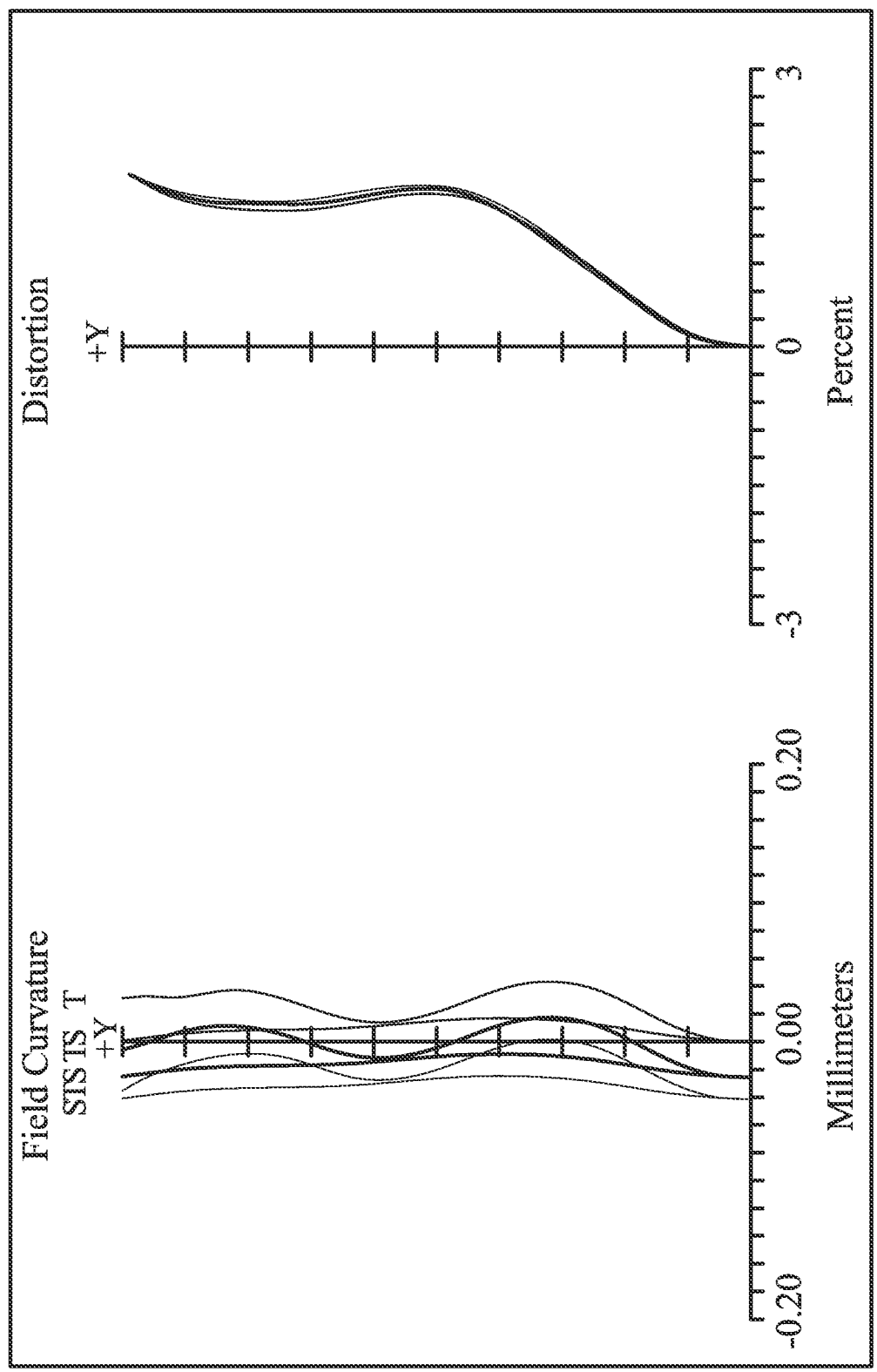
Figure 3C:
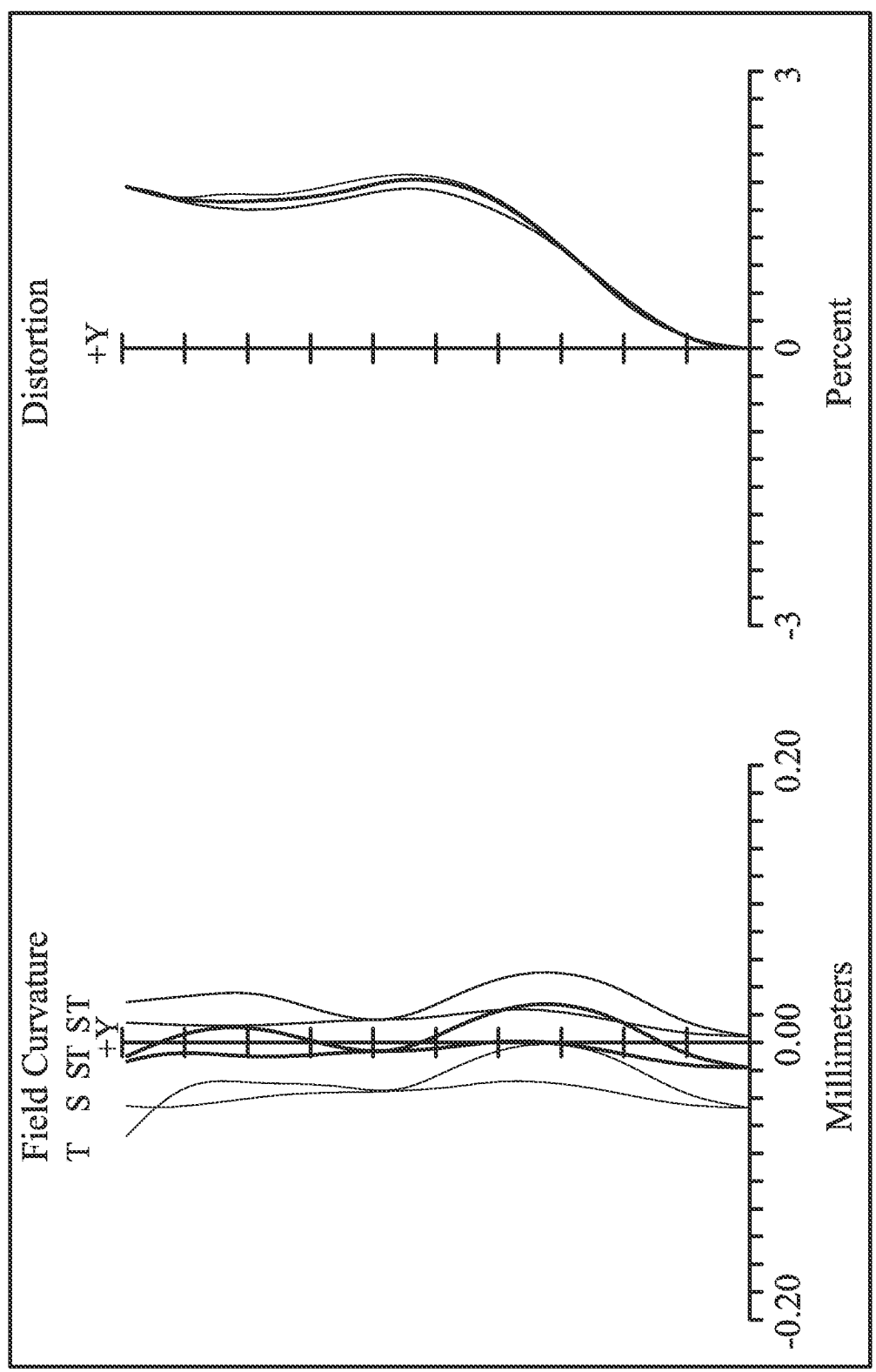
Figure 4A:
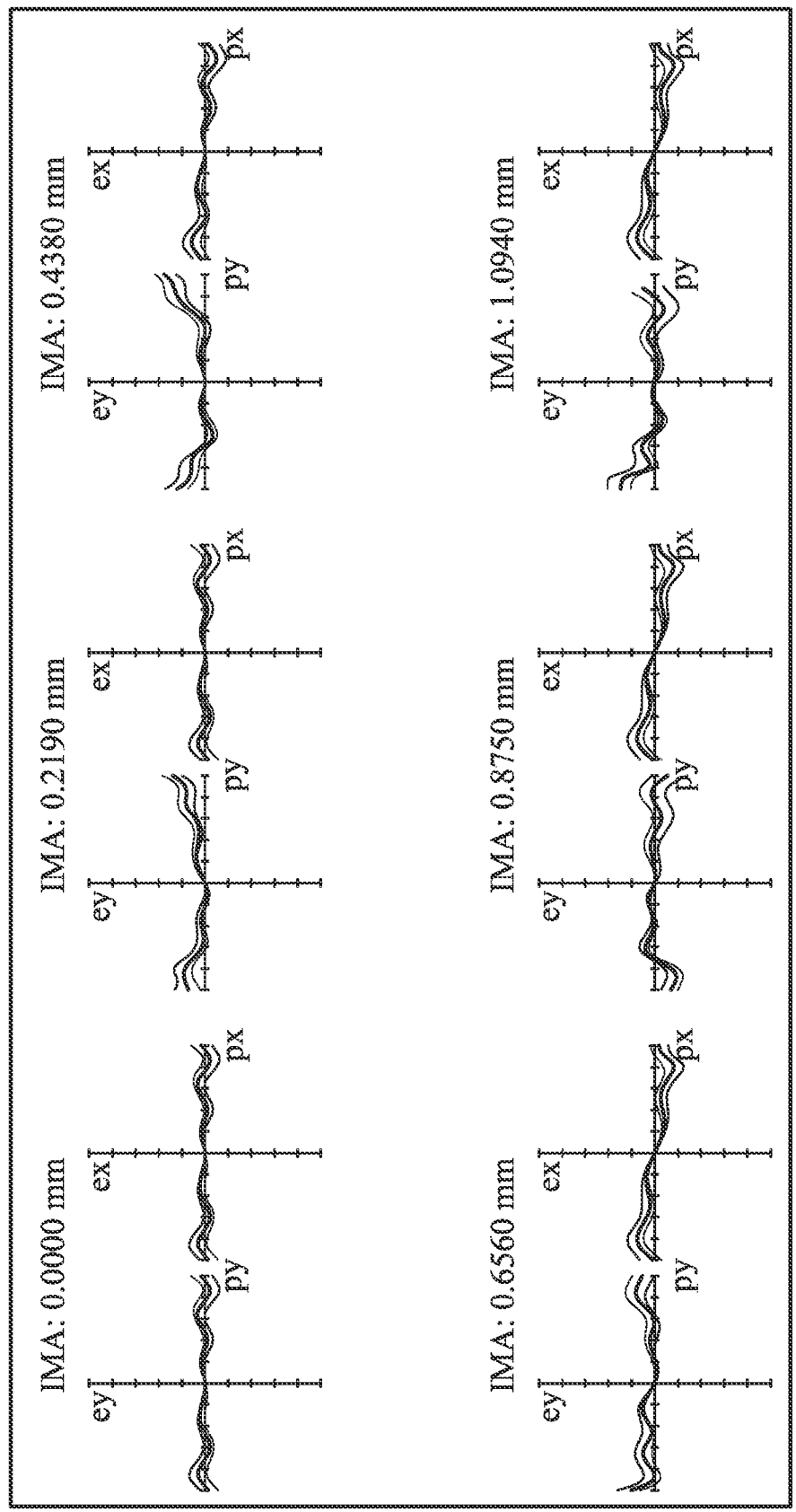
Figure 4B:
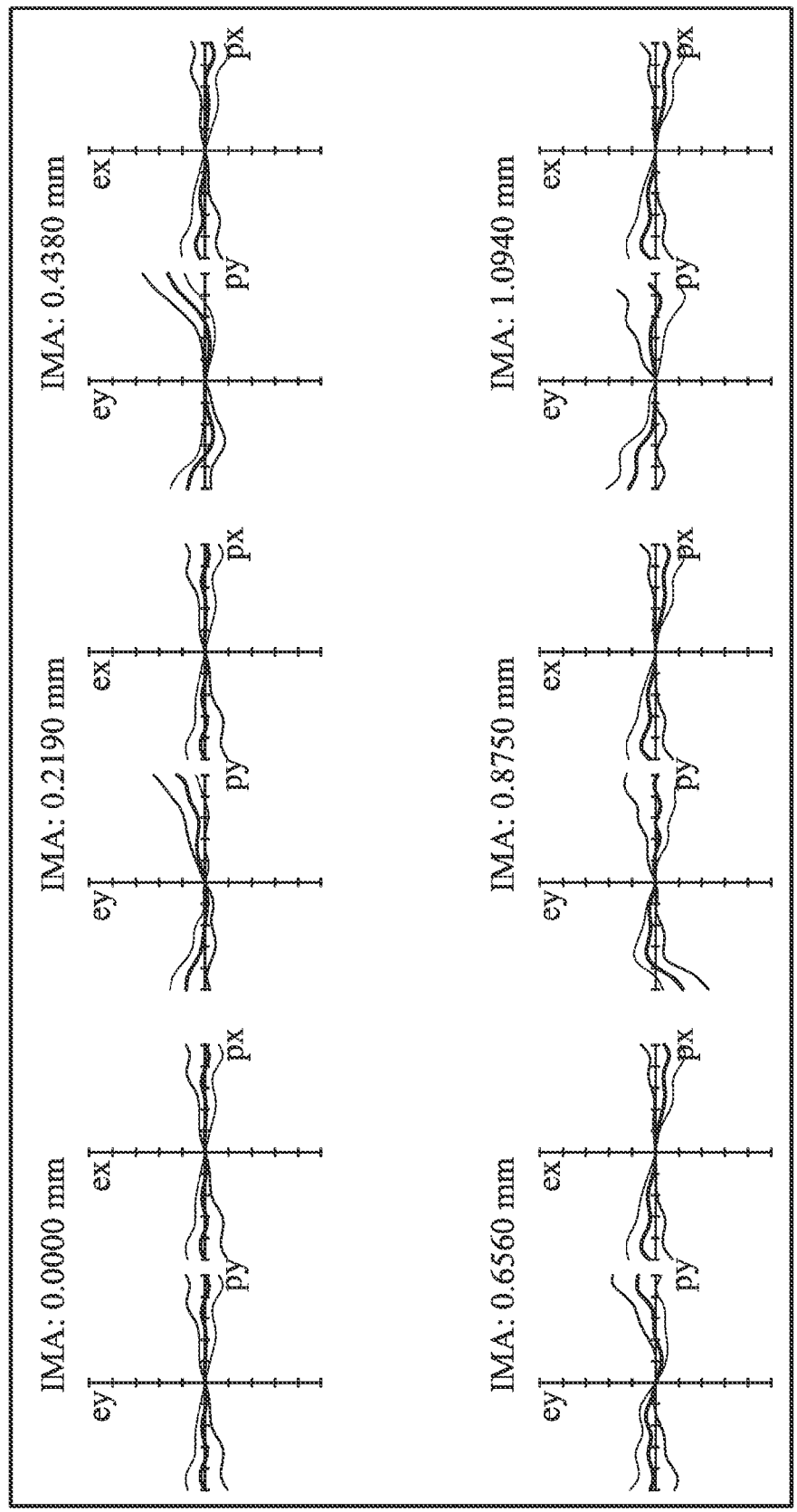
Figure 4C:
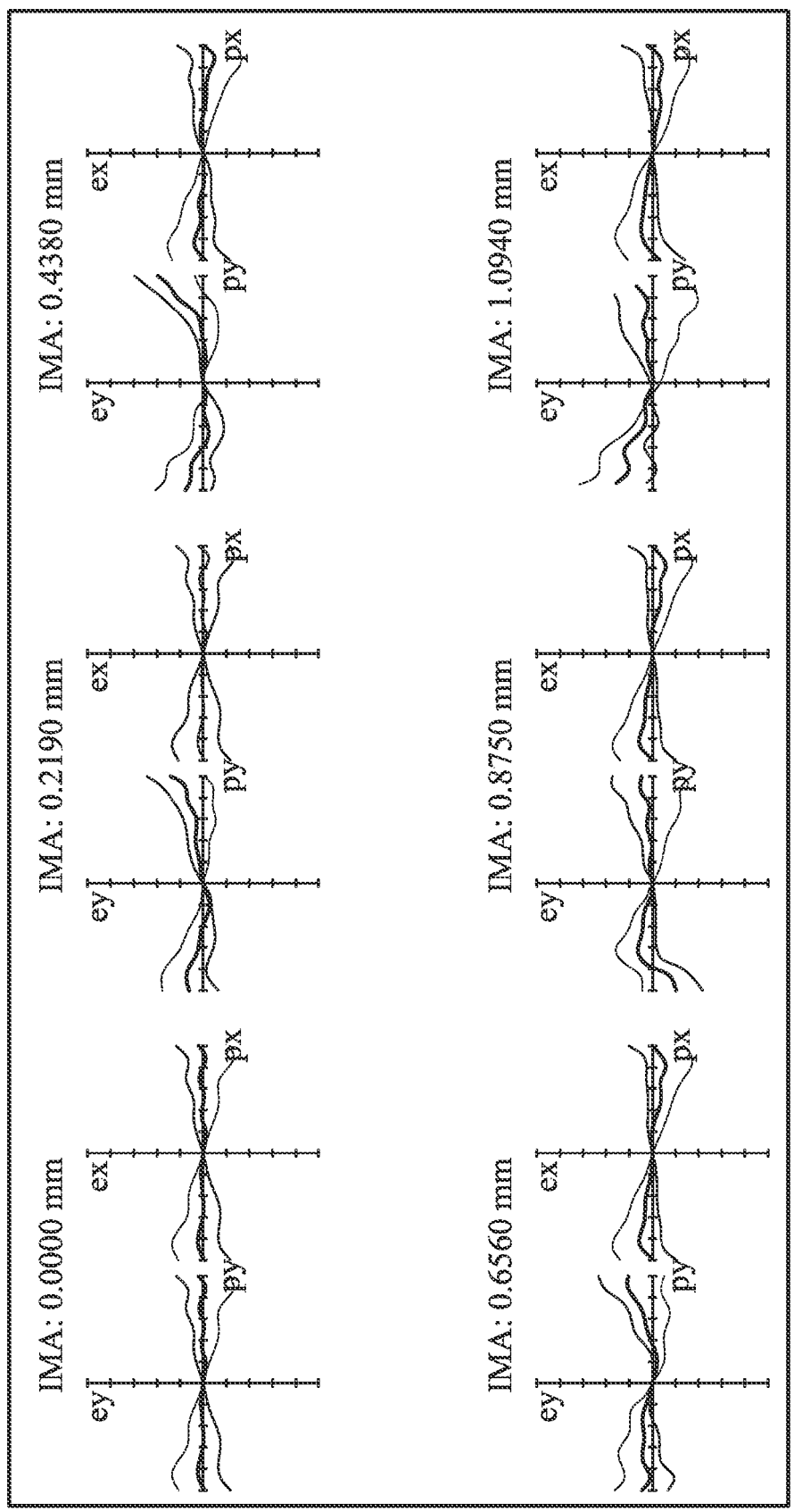

In addition, the surfaces of the micro-lens modules in accordance with the present invention all adopt aspheric shapes, of which the formula is expressed as follows:

$$z = \frac{ch^2}{1+[1-(k+1)c^2h^2]^{\frac{1}{2}}} + \alpha_2 h^4 + \alpha_3 h^6 + \alpha_4 h^8 + \alpha_5 h^{10} + \alpha_6 h^{12} + \alpha_7 h^{14} + \alpha_8 h^{16}$$

Where z represents a sag amount which is defined as a distance from a point on the aspheric surface to a plane tangential to the aspheric surface at the optical axis A; k is taper constant; c=1/r, r being radius of curvature; h is the height of the lens; $\alpha_2$ is the 4th order aspheric coefficient; $\alpha_3$ is the 6th order aspheric coefficient; $\alpha_4$ is the 8th order aspheric coefficient; $\alpha_5$ is the 10th order aspheric coefficient; $\alpha_6$ is the 12th order aspheric coefficient, and so on. The FIGS. 3A-3C and FIGS. 4A-4C are imaging optical simulation data diagrams of the lens array 10 of FIG. 1B. As shown in FIGS. 3A-3C, the field curvature diagrams and the distortion diagrams respectively correspond to the first micro-lens module L1, the second micro-lens module L2, and the third micro-lens module L3. Specifically, FIG. 3A shows the field curvature and distortion of the first micro-lens module L1 when wavelengths of light respectively located at 650 nm, 610 nm and 570 nm are received by the first micro-lens module L1. FIG. 3B shows the field curvature and distortion of the second micro-lens module L2 when wavelengths of light respectively located at 490 nm, 530 nm and 610 nm are received by the second micro-lens module L2. FIG. 3C shows the field curvature and distortion of the third micro-lens module L3 when wavelengths of light respectively located at 410 nm, 450 nm and 490 nm are received by the third micro-lens module L3. Moreover, as shown in FIGS. 4A-4C, the transverse ray fan plots of images respectively correspond to the first micro-lens module L1, the second micro-lens module L2, and the third micro-lens module L3. According to the above first embodiment, the axial aberration of the lens array 10 of the present embodiment can be effectively improved as shown in FIGS. 3A-3C and FIGS. 4A-4C. Furthermore, the difference among the chief ray angle (CRA) of the first micro-lens module L1, the second micro-lens module L2, and the third micro-lens module L3 is less than ±0.5 degrees, and the difference among the distortions of the first micro-lens module L1, the second micro-lens module L2, and the third micro-lens module L3 is less than ±0.5%. Additionally, the effective focal length of the first lens group (i.e. first lens and second lens) is f1, the effective focal length of the second lens group (i.e. third lens and fourth lens) is f2, and the micro-lens modules also satisfy the following condition: $-0.2<f1/f2<0.5$.

A second embodiment of the lens array 10 is provided below. In the second embodiment, the total track is 2.34 and the image space F/# is 2.8. The second embodiment of the lens array 10 in accordance with the present invention presents the following data.

TABLE 3-1

Total Track: 2.34 Image Space F/#: 2.8

| Surface | Radius curvature (mm) | Distance (mm) | Index of Refraction | Abbe Number | Notes |
|---|---|---|---|---|---|
| S1 | Table 3-2 | 0.23 | 1.52 | 48.7 | first lens |
| S2 | Infinity | 0.7 | 1.51 | 61.6 | first flat lens |
| S3 | Infinity | 0.09 | 1.57 | 31.4 | second lens |

TABLE 3-1-continued

Total Track: 2.34 Image Space F/#: 2.8

| Surface | Radius curvature (mm) | Distance (mm) | Index of Refraction | Abbe Number | Notes |
|---|---|---|---|---|---|
| S4 | 2.316756 | 0.19 | air | | |
| S5 | 1.365649 | 0.05 | 1.57 | 31.4 | third lens |
| S6 | Infinity | 0.4 | 1.51 | 61.6 | second flat lens |
| S7 | Infinity | 0.22 | 1.57 | 31.4 | |
| S8 | 1.389641 | 0.46 | air | | fourth lens |

TABLE 3-2

| micro-lens module | Surface | Radius of curvature (mm) |
|---|---|---|
| first | S1 | 0.862067 |
| second | S1 | 0.864652 |
| third | S1 | 0.879106 |

The data of the aspheric coefficients of the surfaces of the lens array 10 of the second embodiment are as follows. The coefficient $\alpha_2$-$\alpha_8$ of the surfaces S4, S5 and S8 are listed in Table 4-1, and the coefficient $\alpha_2$-$\alpha_8$ of the surface S1 of the first, second and third micro-lens modules are listed in Table 4-2.

TABLE 4-1

| Aspheric Surface Parameter | conic constant K | $\alpha_2$ | $\alpha_3$ | $\alpha_4$ |
|---|---|---|---|---|
| S4 | −49.5 | 0.14847258 | −29.969677 | 697.9486 |
| S5 | −0.59 | −1.7807227 | 3.4962225 | −22.1619 |
| S8 | 0.51 | −0.58733687 | −0.5574332 | 2.942236 |

| Aspheric Surface Parameter | $\alpha_5$ | $\alpha_6$ | $\alpha_7$ | $\alpha_8$ |
|---|---|---|---|---|
| S4 | −8144.242 | 55709.388 | −225120.18 | 497309.5 |
| S5 | 175.93162 | −850.51706 | 1947.192 | −1527.66 |
| S8 | −5.800614 | 5.6664872 | −2.8311738 | 0.550748 |

TABLE 4-2

| micro-lens module | Aspheric Surface Parameter | conic constant K | $\alpha_2$ | $\alpha_3$ | $\alpha_4$ |
|---|---|---|---|---|---|
| first | S1 | −68.094 | 8.753173 | −164.101 | 2263.497 |
| second | S1 | −62.6377 | 8.614815 | −162.58 | 2259.142 |
| third | S1 | −72.7008 | 8.947792 | −167.077 | 2269.85 |

| micro-lens module | Aspheric Surface Parameter | $\alpha_5$ | $\alpha_6$ | $\alpha_7$ | $\alpha_8$ |
|---|---|---|---|---|---|
| first | S1 | −19731.3 | 97816.81 | −228993 | 138969.8 |
| second | S1 | −19742.3 | 97952 | −230918 | 148466.2 |
| third | S1 | −19624.6 | 97539.13 | −231745 | 148466.3 |

Figure 5A:
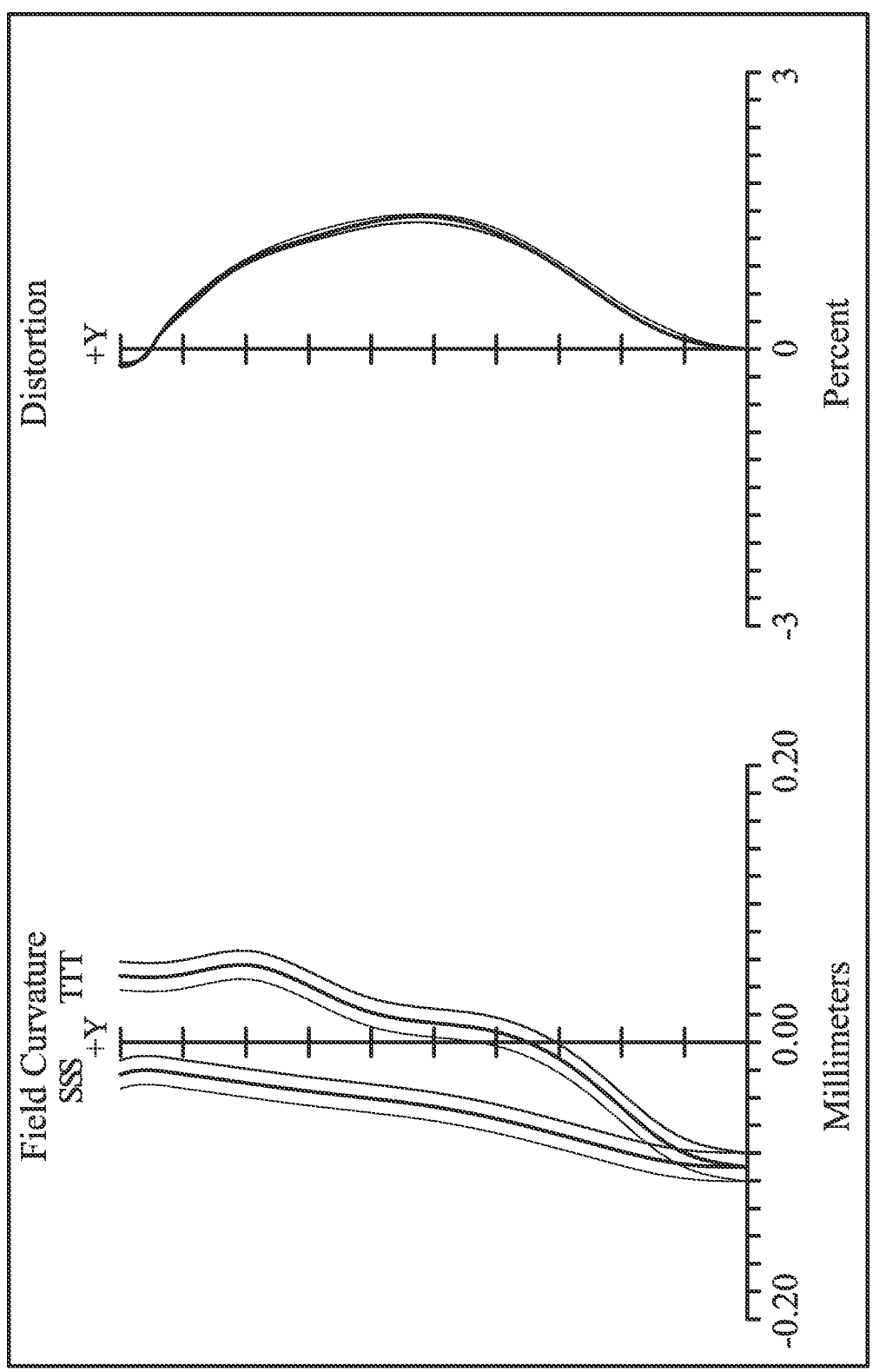
FIGS. 5A-5C and 6A-6C are simulation data diagrams of the lens array according another embodiment of the present invention.
Figure 5B:
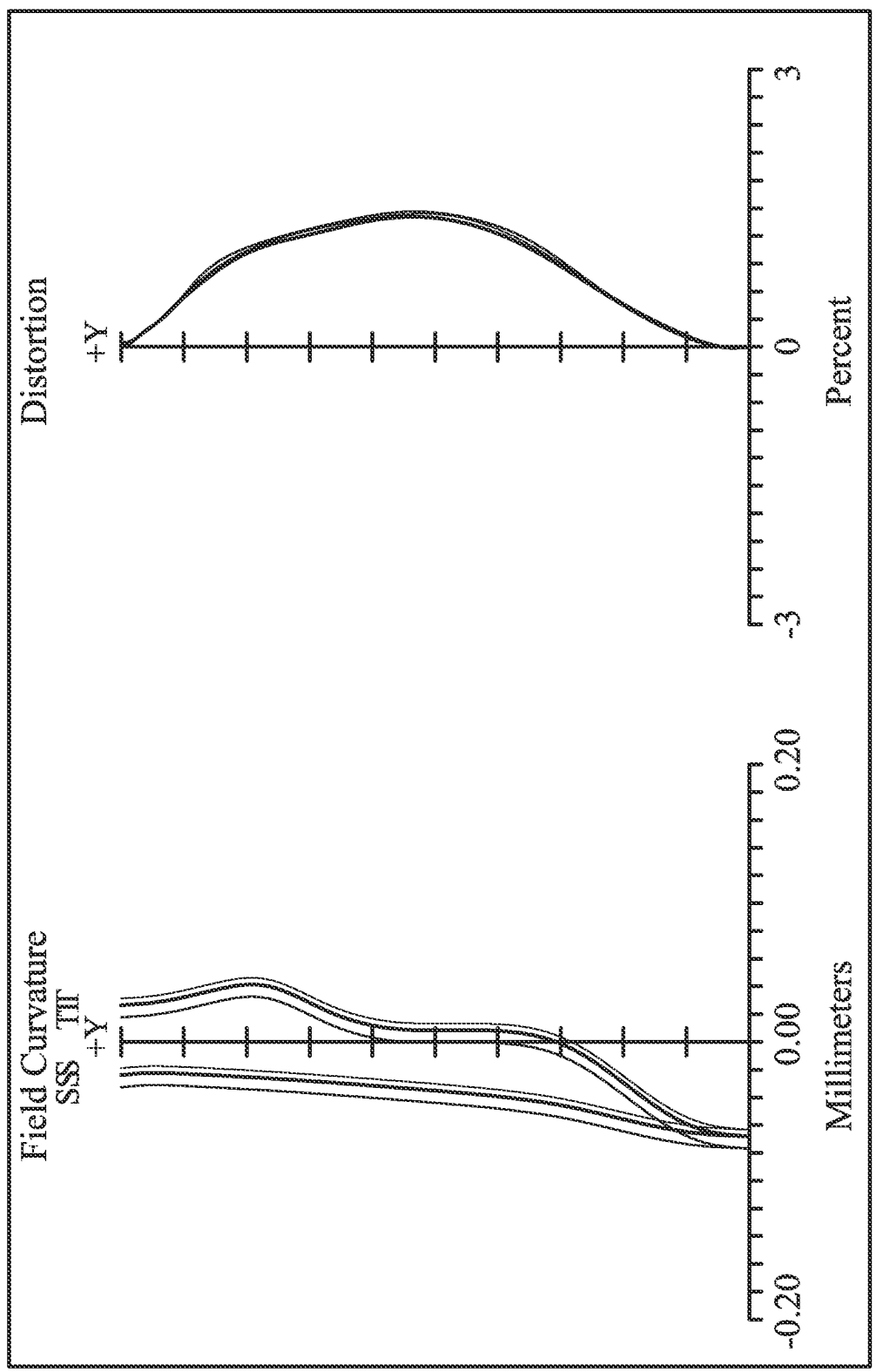
Figure 5C:
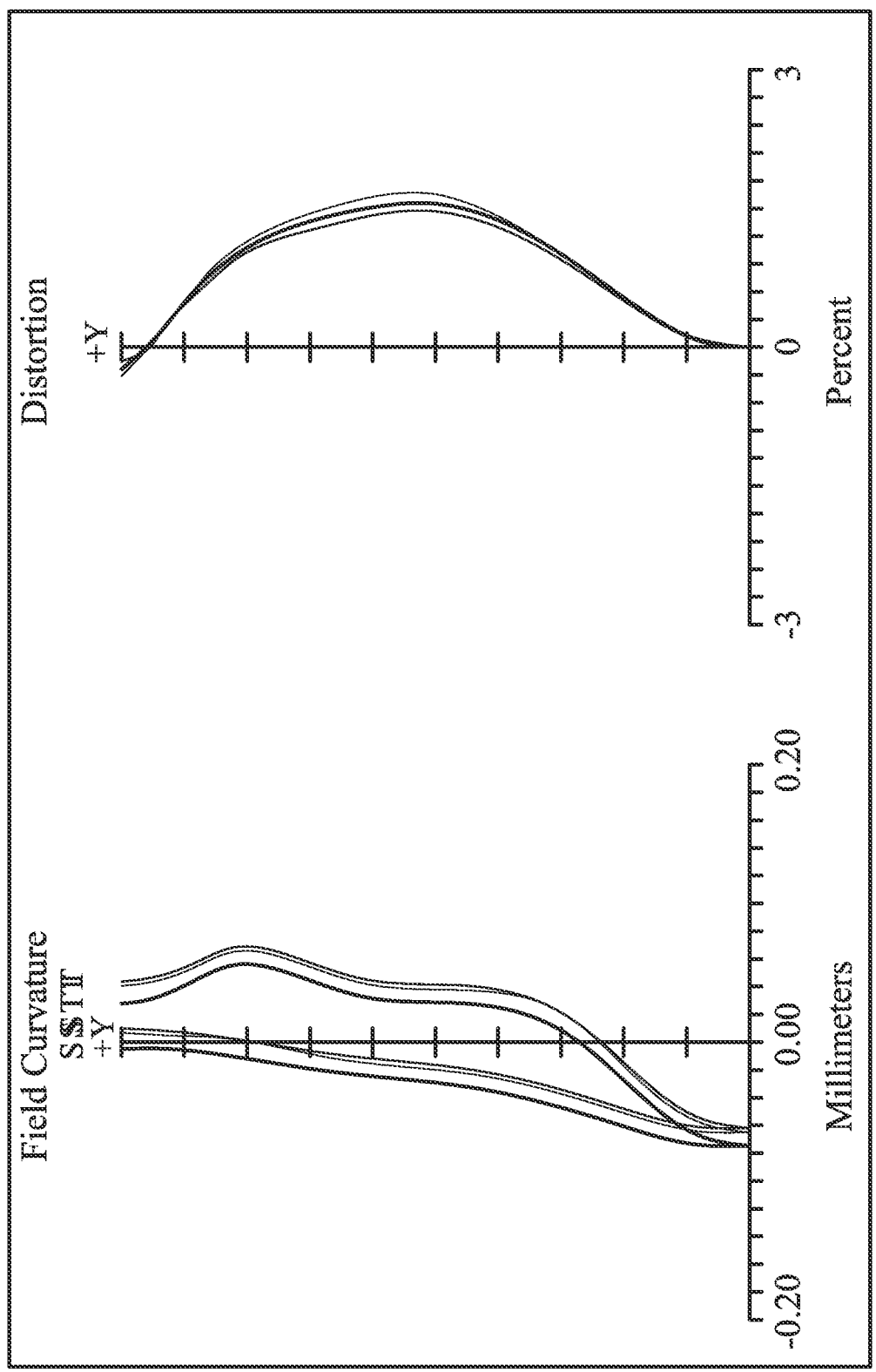
Figure 6A:
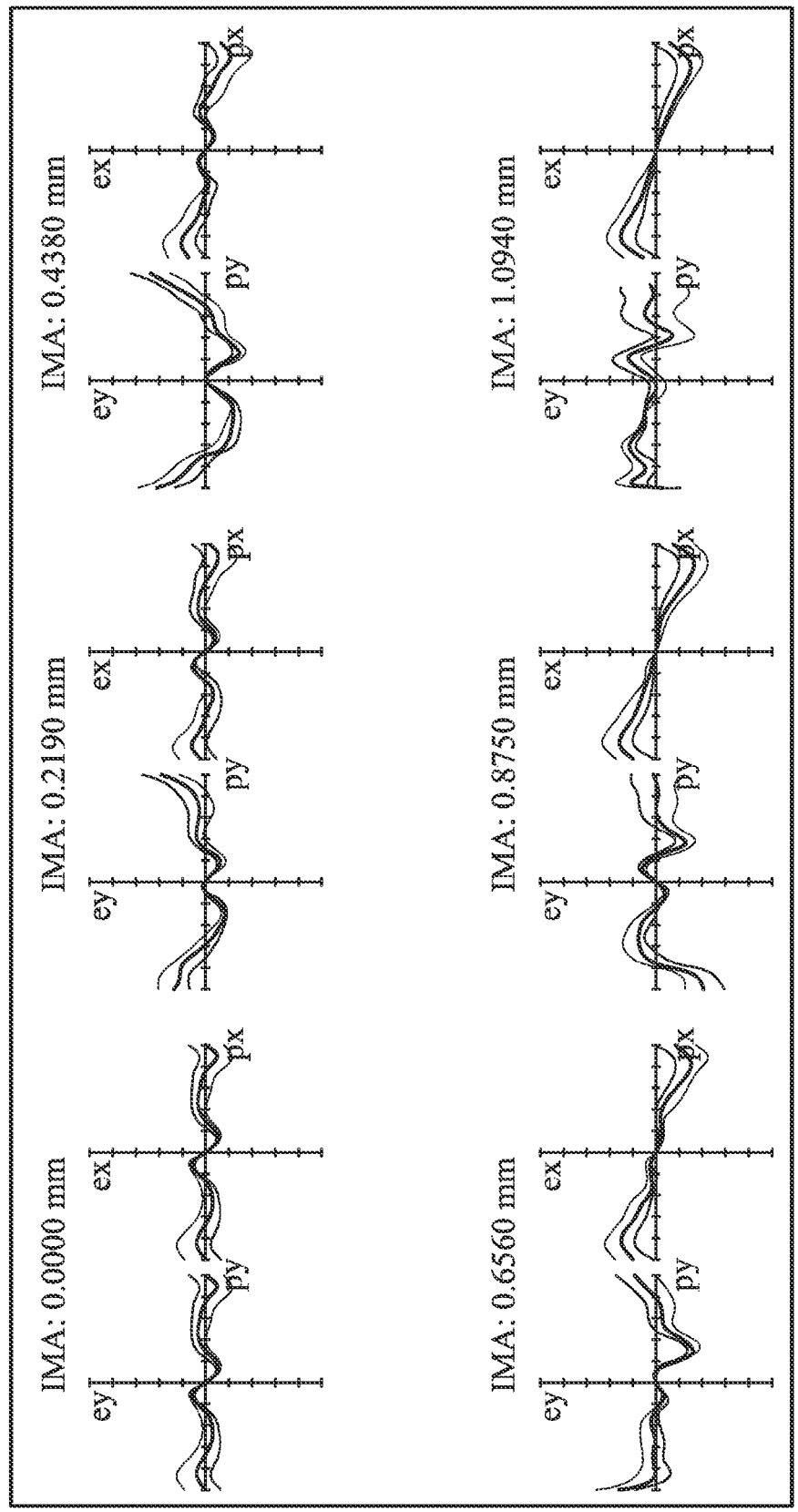
Figure 6B:
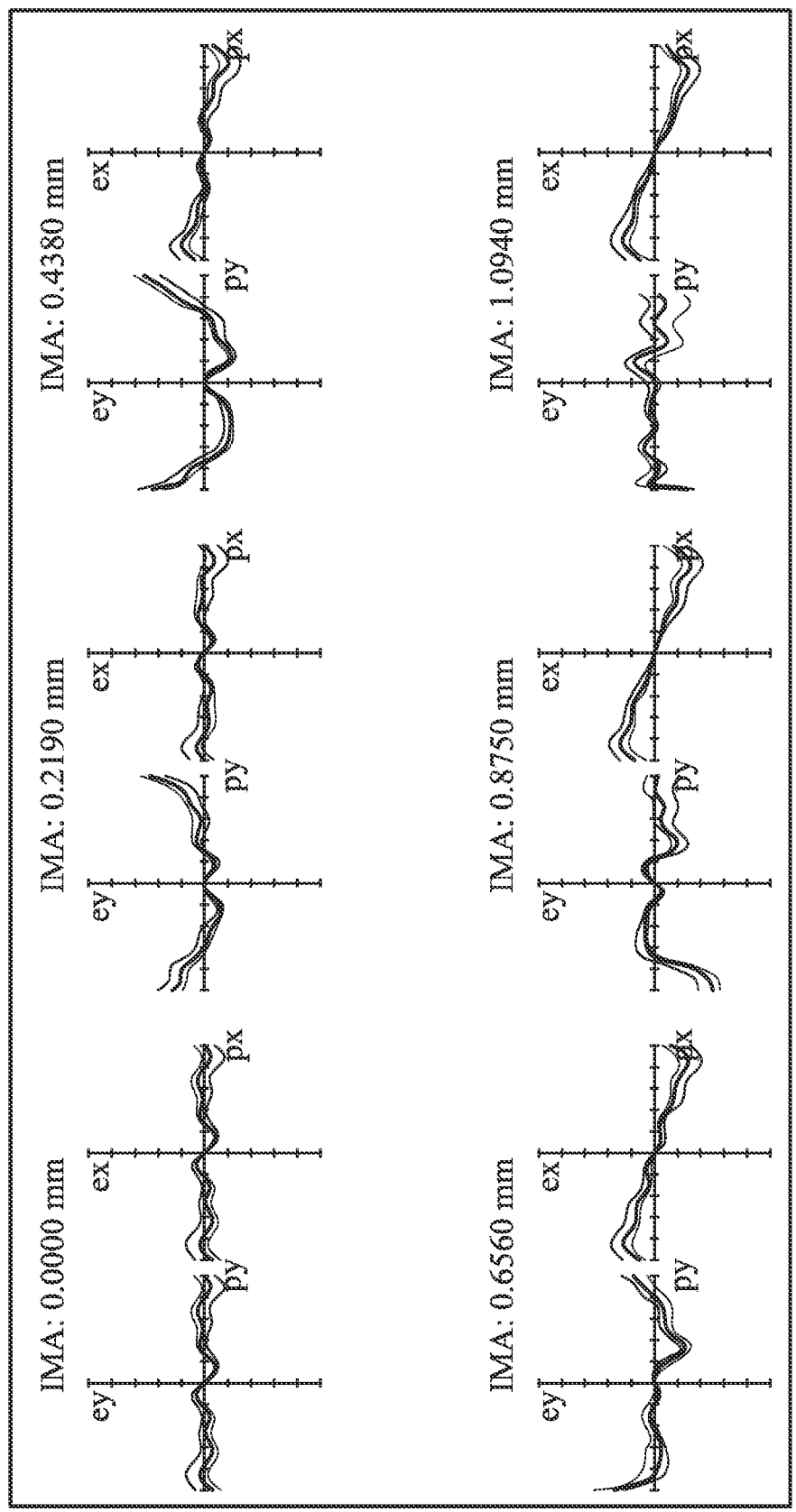
Figure 6C:
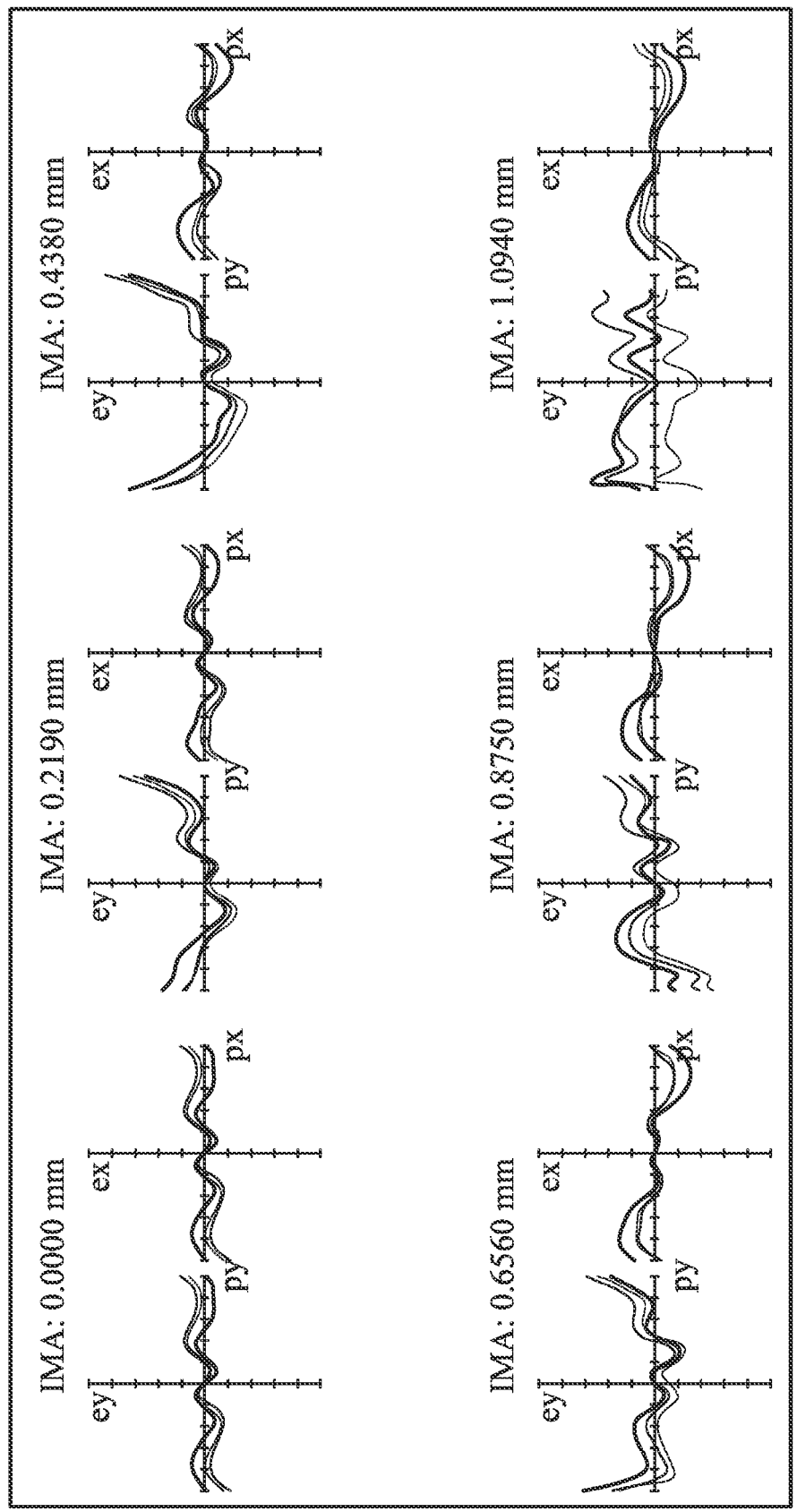

FIGS. 5A-5C and FIGS. 6A-6C are imaging optical simulation data diagrams of the lens array 10 of the second embodiment. As shown in FIGS. 5A-5C, the field curvature diagrams and the distortion diagrams respectively correspond to the first micro-lens module L1, the second micro-lens module L2, and the third micro-lens module L3. Specifically, FIG. 5A shows the field curvature and distortion of the first micro-lens module L1 when wavelengths of light respectively located at 650 nm, 610 nm and 570 nm are received by the first micro-lens module L1. FIG. 5B shows the field curvature and distortion of the second micro-lens module L2 when wavelengths of light respectively located at 490 nm, 530 nm and 610 nm are received by the second micro-lens module L2. FIG. 5C shows the field curvature and distortion of the third micro-lens module L3 when wavelengths of light respectively located at 410 nm, 450 nm and 490 nm are received by the third micro-lens module L3. Moreover, as shown in FIGS. 6A-6C, the transverse ray fan plots of images respectively correspond to the first micro-lens module L1, the second micro-lens module L2, and the third micro-lens module L3. According to the above second embodiment, the axial aberration of the lens array 10 of the present embodiment can be effectively improved as shown in FIGS. 5A-5C and FIGS. 6A-6C. Furthermore, the difference among the CRA of the first micro-lens module L1, the second micro-lens module L2, and the third micro-lens module L3 is less than ±0.5 degrees, and the difference among the distortions of the first micro-lens module L1, the second micro-lens module L2, and the third micro-lens module L3 is less than ±0.5%. Additionally, the effective focal length of the first lens group (i.e. first lens and second lens) is f1, the effective focal length of the second lens group (i.e. third lens and fourth lens) is f2, and the micro-lens modules also satisfy the following condition: $-0.2 < f1/f2 < 0.5$.

A third embodiment of the lens array 10 is provided below. In the second embodiment, the total track is 2.27 and the image space F/# is 3.2. The third embodiment of the lens array 10 in accordance with the present invention presents the following data:

TABLE 5-1

Total Track: 2.31 Image Space F/#: 3.2

| Surface | Radius curvature (mm) | Distance (mm) | Index of Refraction | Abbe Number | Notes |
|---|---|---|---|---|---|
| S1 | Table 5-2 | 0.2 | 1.52 | 48.7 | first lens |
| S2 | Infinity | 0.7 | 1.51 | 61.6 | first flat lens |
| S3 | Infinity | 0.09 | 1.57 | 31.4 | second lens |
| S4 | 2.114985 | 0.19 | air | | |
| S5 | 1.943325 | 0.05 | 1.57 | 31.4 | third lens |
| S6 | Infinity | 0.4 | 1.51 | 61.6 | second flat lens |
| S7 | Infinity | 0.22 | 1.57 | 31.4 | |
| S8 | 1.457394 | 0.46 | air | | fourth lens |

TABLE 5-2

| micro-lens module | Surface | Radius of curvature (mm) |
|---|---|---|
| first | S1 | 0.803569 |
| second | S1 | 0.802932 |
| third | S1 | 0.807299 |

The data of the aspheric coefficients of the surfaces of the lens array 10 of the third embodiment are as follows. The coefficient $\alpha_2$-$\alpha_8$ of the surfaces S4, S5 and S8 are listed in Table 6-1, and the coefficient $\alpha_2$-$\alpha_8$ of the surface S1 of the first, second and third micro-lens modules L1-L3 are listed in Table 6-2.

TABLE 6-1

| Aspheric Surface Parameter | conic constant K | $\alpha_2$ | $\alpha_3$ | $\alpha_4$ |
|---|---|---|---|---|
| S4 | −105.15 | 3.6514897 | −149.58176 | 3121.391 |
| S5 | −0.74 | −1.6571301 | −8.3759554 | 276.7454 |
| S8 | 1.29 | −0.93235406 | 1.3184018 | −2.62949 |

| Aspheric Surface Parameter | $\alpha_5$ | $\alpha_6$ | $\alpha_7$ | $\alpha_8$ |
|---|---|---|---|---|
| S4 | −35805.76 | 240541.8 | −947299.34 | 2042644 |
| S5 | −3740.865 | 28783.184 | −126234.18 | 288728.2 |
| S8 | 3.5843195 | −4.3700212 | 3.8566579 | −1.70404 |

TABLE 6-2

| micro-lens module | Aspheric Surface Parameter | conic constant K | $\alpha_2$ | $\alpha_3$ | $\alpha_4$ |
|---|---|---|---|---|---|
| first | S1 | −74.3632 | 14.87526 | −443.067 | 9500.106 |
| second | S1 | −78.1133 | 15.0122 | −447.387 | 9566.608 |
| third | S1 | −81.8787 | 15.11061 | −447.161 | 9500.477 |

| micro-lens module | Aspheric Surface Parameter | $\alpha_5$ | $\alpha_6$ | $\alpha_7$ | $\alpha_8$ |
|---|---|---|---|---|---|
| first | S1 | −127721 | 1014762 | 4330701 | 7625332 |
| second | S1 | −128296 | 1017762 | 4341711 | 7650093 |
| third | S1 | −127344 | 1015344 | 4375433 | 7826479 |

Figure 7A:
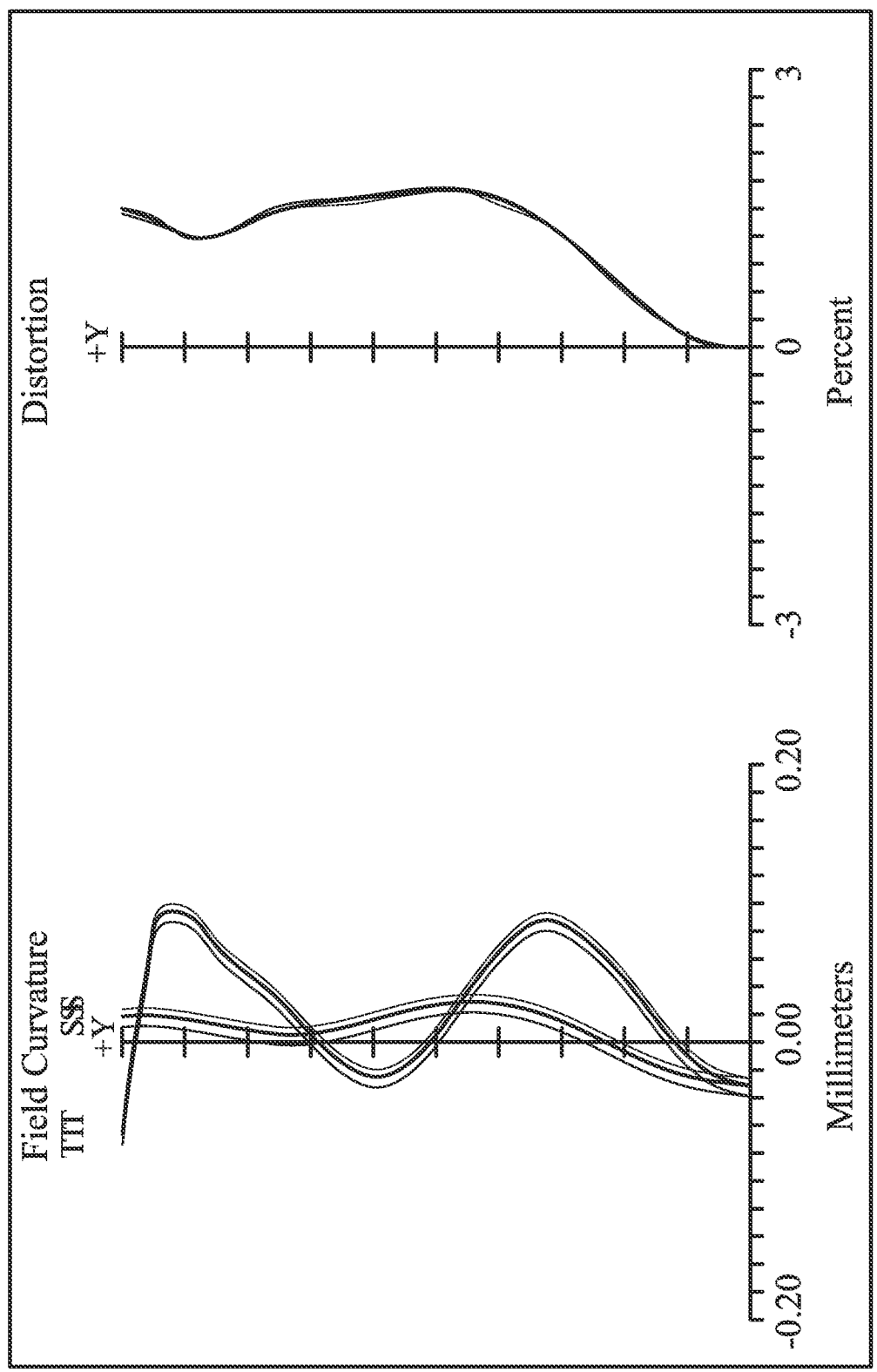
FIGS. 7A-7C and 8A-8C are simulation data diagrams of the lens array according another embodiment of the present invention.
Figure 7B:
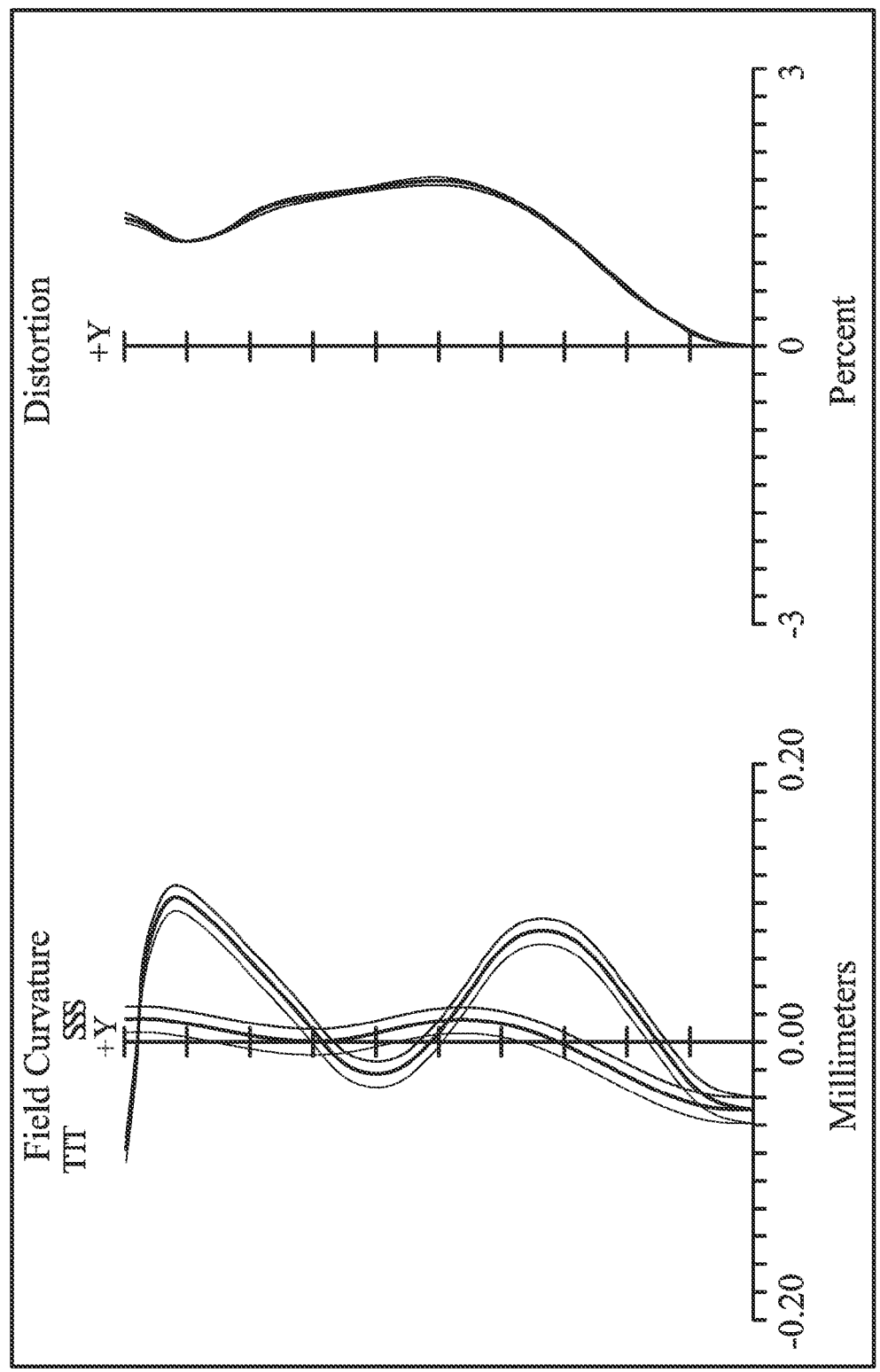
Figure 7C:
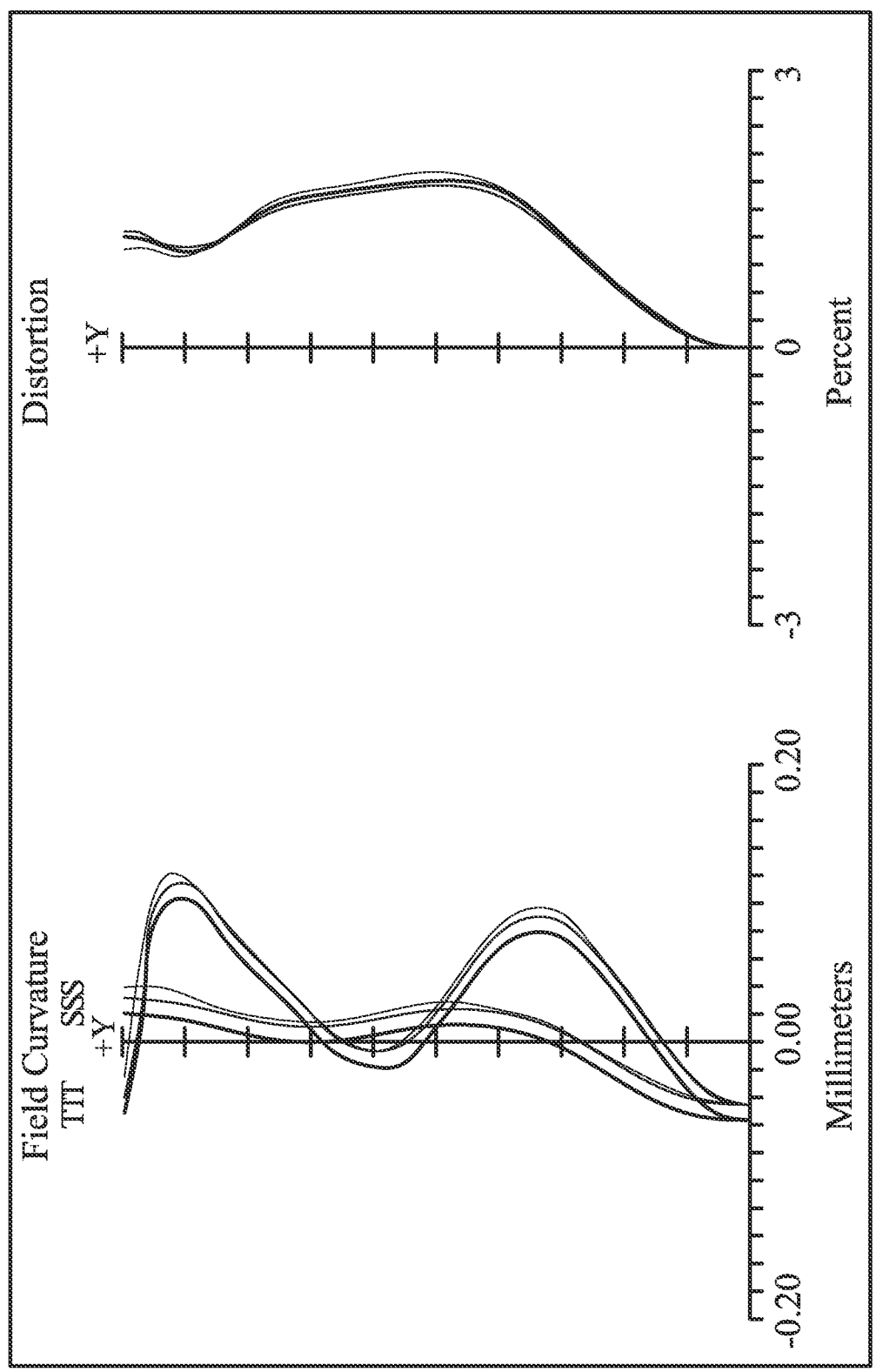
Figure 8A:
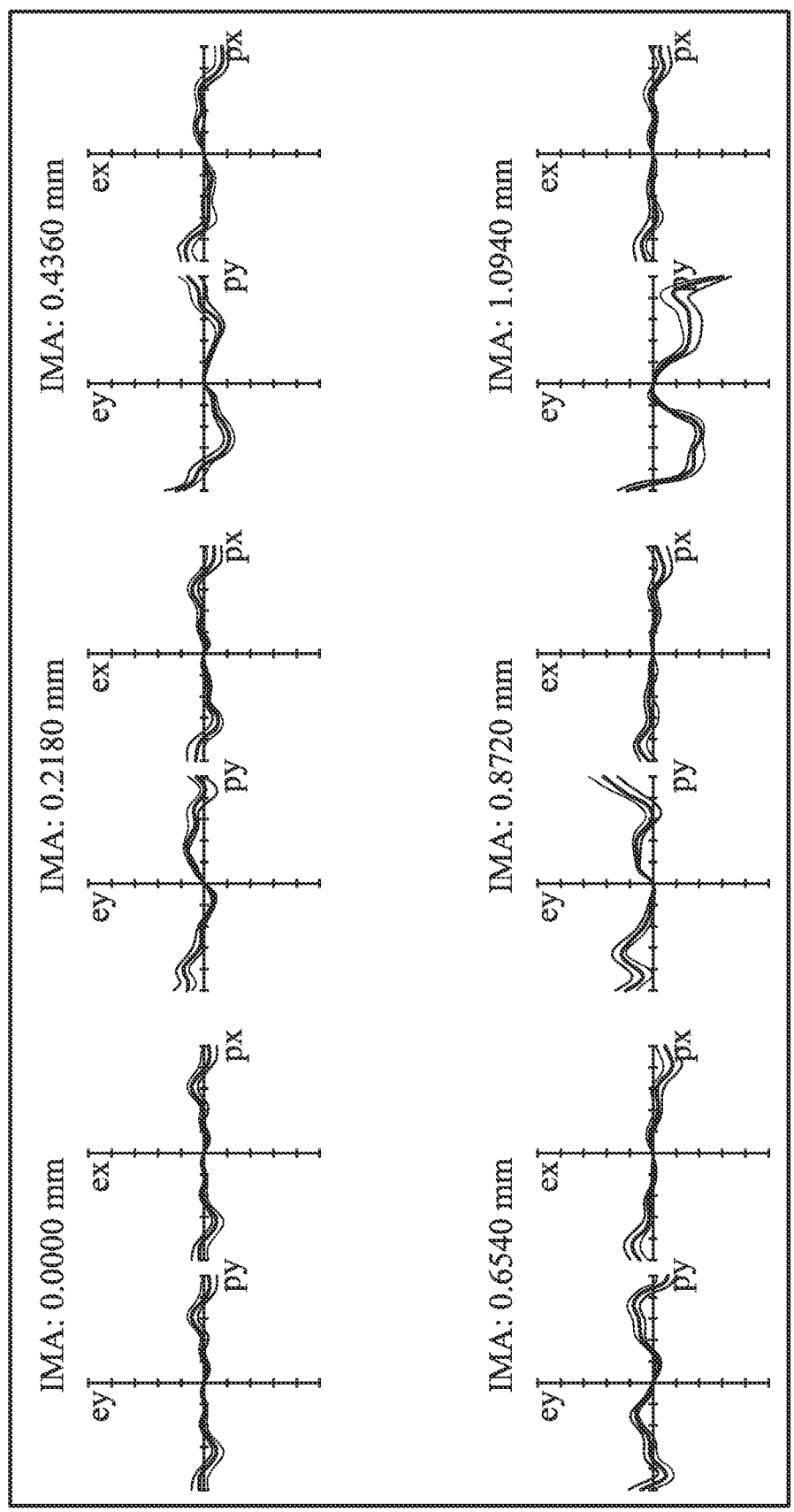
Figure 8B:
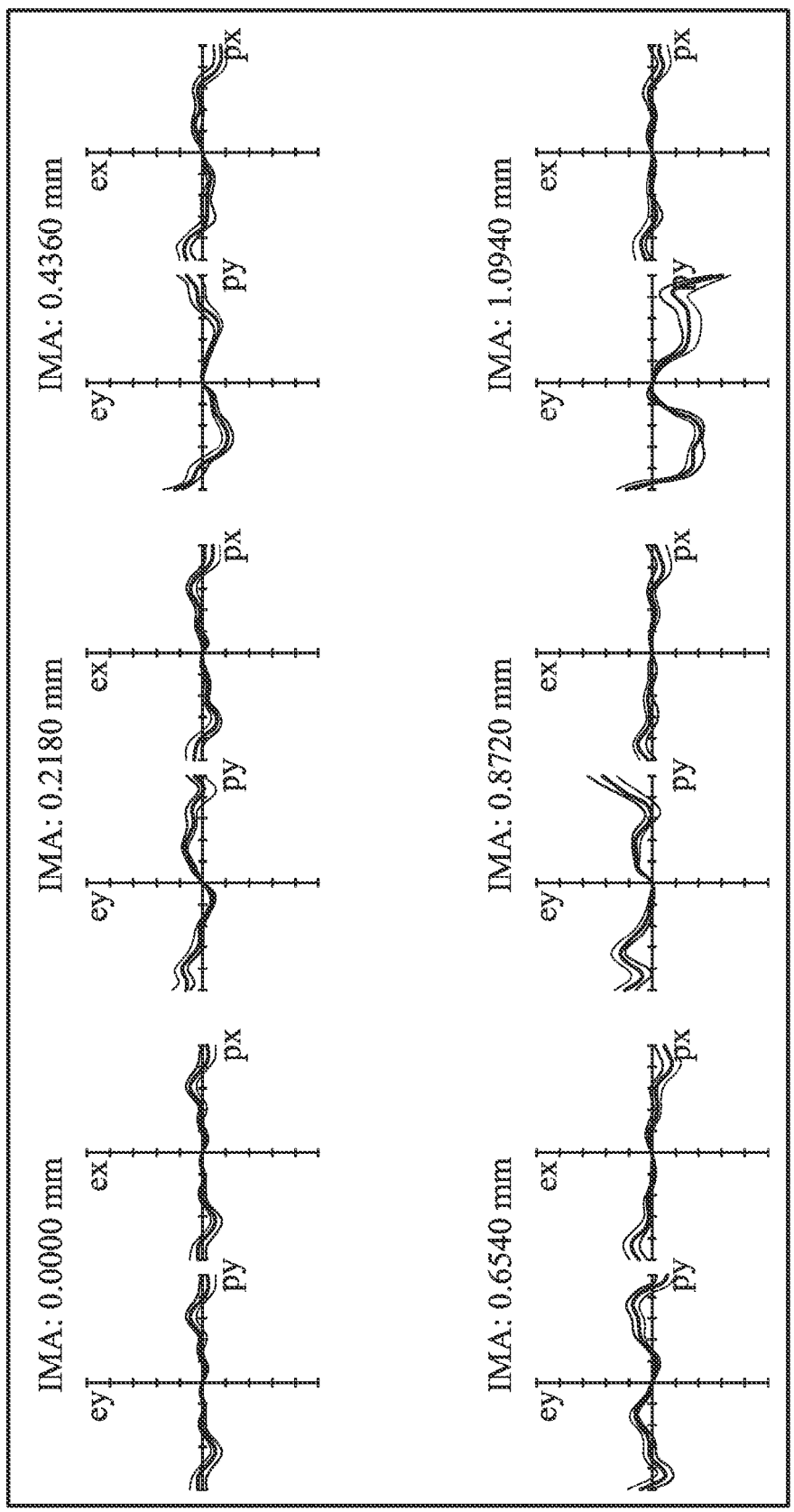
Figure 8C:
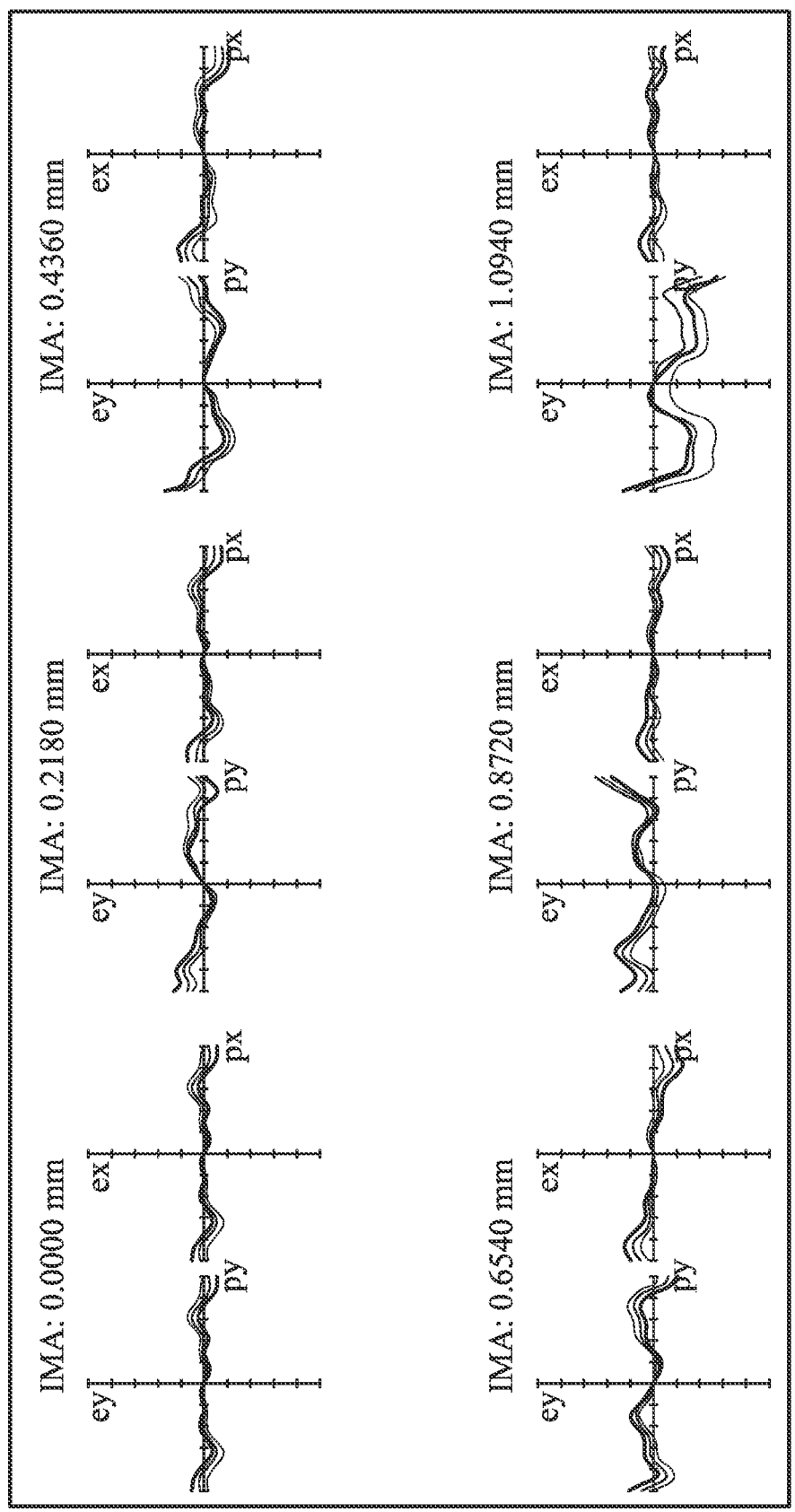

FIGS. 7A-7C and FIGS. 8A-8C are imaging optical simulation data diagrams of the lens array 10 of the third embodiment. As shown in FIGS. 7A-7C, the field curvature diagrams and the distortion diagrams respectively correspond to the first micro-lens module L1, the second micro-lens module L2, and the third micro-lens module L3. Specifically, FIG. 7A shows the field curvature and distortion of the first micro-lens module L1 when wavelengths of light respectively located at 650 nm, 610 nm and 570 nm are received by the first micro-lens module L1. FIG. 7B shows the field curvature and distortion of the second micro-lens module L2 when wavelengths of light respectively located at 490 nm, 530 nm and 610 nm are received by the second micro-lens module L2. FIG. 7C shows the field curvature and distortion of the third micro-lens module L3 when wavelengths of light respectively located at 410 nm, 450 nm and 490 nm are received by the third micro-lens module L3. Moreover, as shown in FIGS. 8A-8C, the transverse ray fan plots of images respectively correspond to the first micro-lens module L1, the second micro-lens module L2, and the third micro-lens module L3. According to the above third embodiment, the axial aberration of the lens array 10 of the present embodiment can be effectively improved as shown in FIGS. 7A-7C and FIGS. 8A-8C. Furthermore, the difference among the CRA of the first micro-lens module L1, the second micro-lens module L2, and the third micro-lens module L3 is less than ±0.5 degrees, and the difference among the distortions of the first micro-lens module L1, the second micro-lens module L2, and the third micro-lens module L3 is less than ±0.5%. Additionally, the effective focal length of the first lens group (i.e. first lens and second lens) is f1, the effective focal length of the second lens group (i.e. third lens and fourth lens) is f2, and the micro-lens modules also satisfy the following condition: −0.2<f1/f2<0.5.

A fourth embodiment of the lens array 10 is provided below. In the second embodiment, the total track is 2.19 and the image space F/# is 3.2. The fourth embodiment of the lens array 10 in accordance with the present invention presents the following data:

TABLE 7-1

Total Track: 2.19 Image Space F/#: 3.2

| Surface | Radius curvature (mm) | Distance (mm) | Index of Refraction | Abbe Number | Notes |
|---|---|---|---|---|---|
| S1 | Table 6-2 | 0.17 | 1.52 | 48.7 | first lens |
| S2 | Infinity | 0.7 | 1.51 | 61.6 | first flat lens |
| S3 | Infinity | 0.06 | 1.57 | 31.4 | second lens |
| S4 | 1.713763 | 0.16 | air | | |
| S5 | 2.159374 | 0.04 | 1.57 | 31.4 | third lens |
| S6 | Infinity | 0.4 | 1.51 | 61.6 | second flat lens |
| S7 | Infinity | 0.26 | 1.57 | 31.4 | |
| S8 | 1.457394 | 0.4 | air | | fourth lens |

TABLE 7-2

| micro-lens module | Surface | Radius of curvature (mm) |
|---|---|---|
| first | S1 | 0.75365 |
| second | S1 | 0.757961 |
| third | S1 | 0.766094 |

The data of the aspheric coefficients of the surfaces of the lens array 10 of the fourth embodiment are as follows. The coefficient $\alpha_2$-$\alpha_8$ of the surfaces S4, S5 and S8 are listed in Table 8-1, and the coefficient $\alpha_2$-$\alpha_8$ of the surface S1 of the first, second and third micro-lens modules L1-L3 are listed in Table 8-2.

TABLE 8-1

| Aspheric Surface Parameter | conic constant K | $\alpha_2$ | $\alpha_3$ | $\alpha_4$ |
|---|---|---|---|---|
| S4 | −194.82 | 4.5146461 | −155.63673 | 3126.33 |
| S5 | −64.9 | −1.5636441 | −8.112307 | 277.9368 |
| S8 | 1.35 | −0.97002275 | 1.2339625 | −2.33489 |

| Aspheric Surface Parameter | $\alpha_5$ | $\alpha_6$ | $\alpha_7$ | $\alpha_8$ |
|---|---|---|---|---|
| S4 | −35626.77 | 240704.67 | −951481.76 | 2030179 |
| S5 | −3764.941 | 28759.523 | −125683.46 | 289241.4 |
| S8 | 3.3727463 | −4.4918164 | 4.0237866 | −1.69048 |

TABLE 8-2

| micro-lens module | Aspheric Surface Parameter | conic constant K | $\alpha_2$ | $\alpha_3$ | $\alpha_4$ |
|---|---|---|---|---|---|
| first | S1 | −57.9183 | 14.88922 | −436.314 | 9400.901 |
| second | S1 | −60.6482 | 15.04742 | −440.228 | 9455.92 |
| third | S1 | −62.7546 | 15.00548 | −438.254 | 9420.654 |

| micro-lens module | Aspheric Surface Parameter | $\alpha_5$ | $\alpha_6$ | $\alpha_7$ | $\alpha_8$ |
|---|---|---|---|---|---|
| first | S1 | −127016 | 1007112 | −4238094 | 7219702 |
| second | S1 | −127750 | 1016501 | −4311309 | 7443119 |
| third | S1 | −127317 | 1009719 | −4242328 | 7188444 |

Figure 9A:
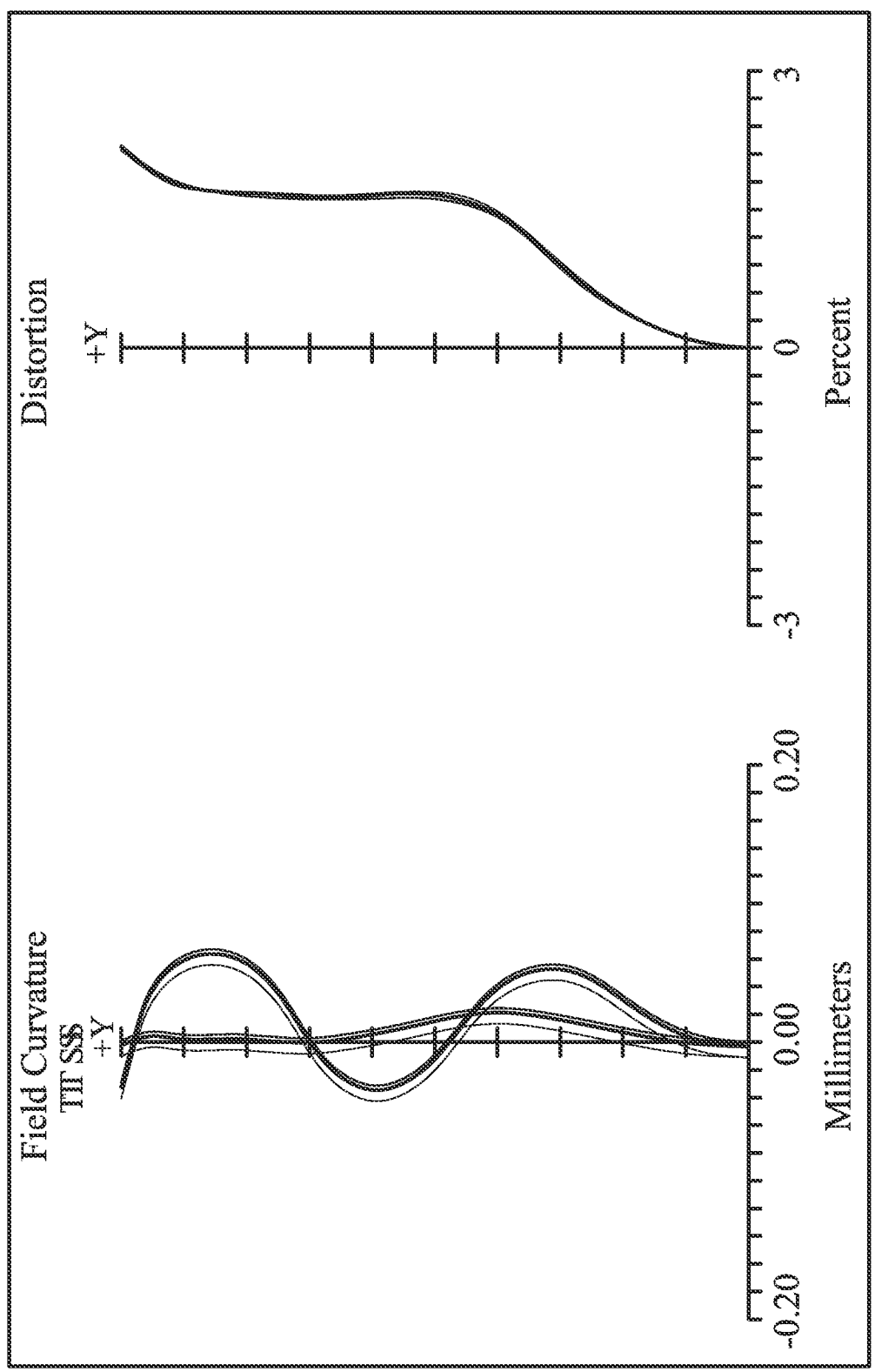
FIGS. 9A-9C and 10A-10C are simulation data diagrams of the lens array according another embodiment of the present invention.
Figure 9B:
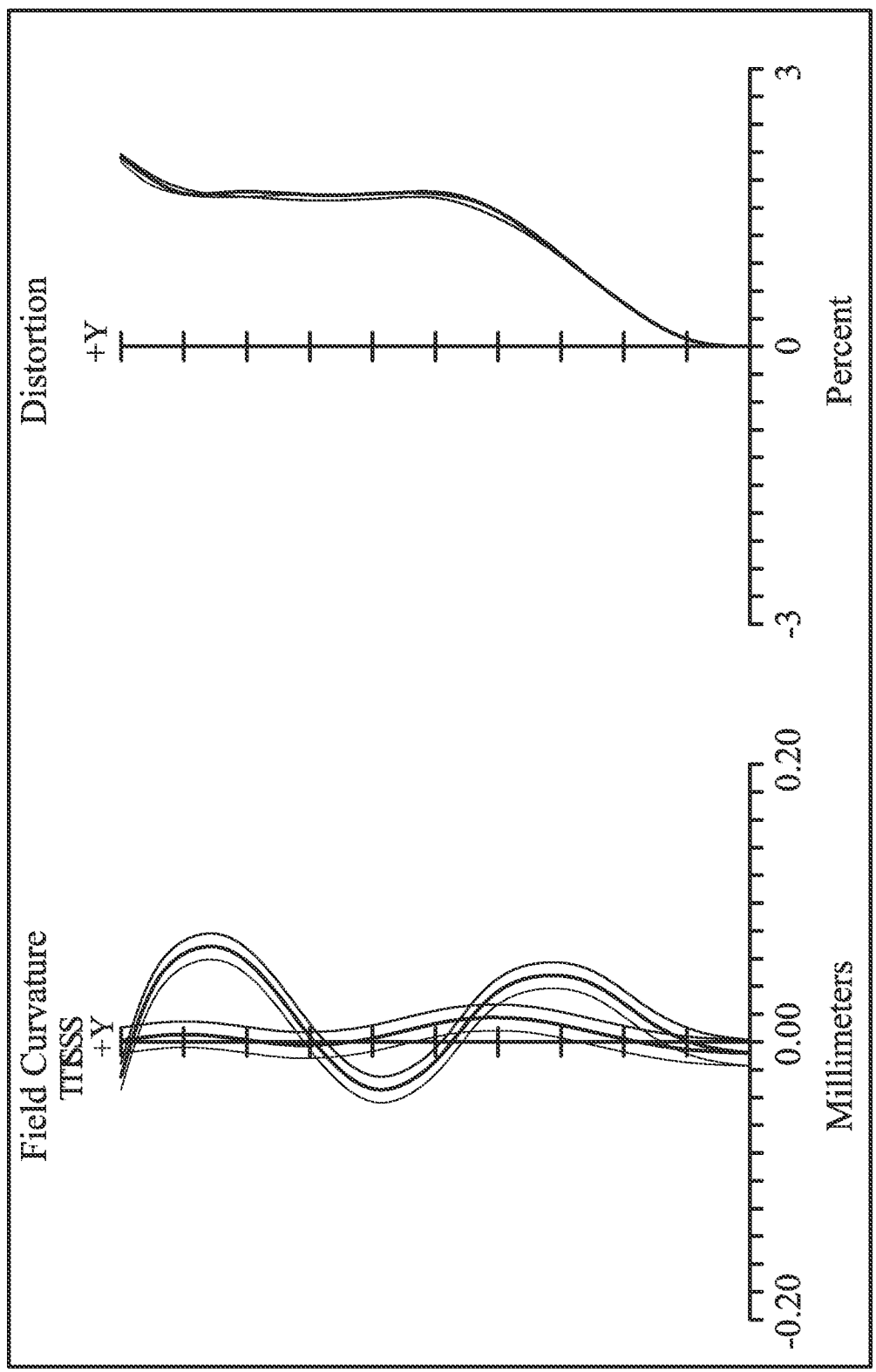
Figure 9C:
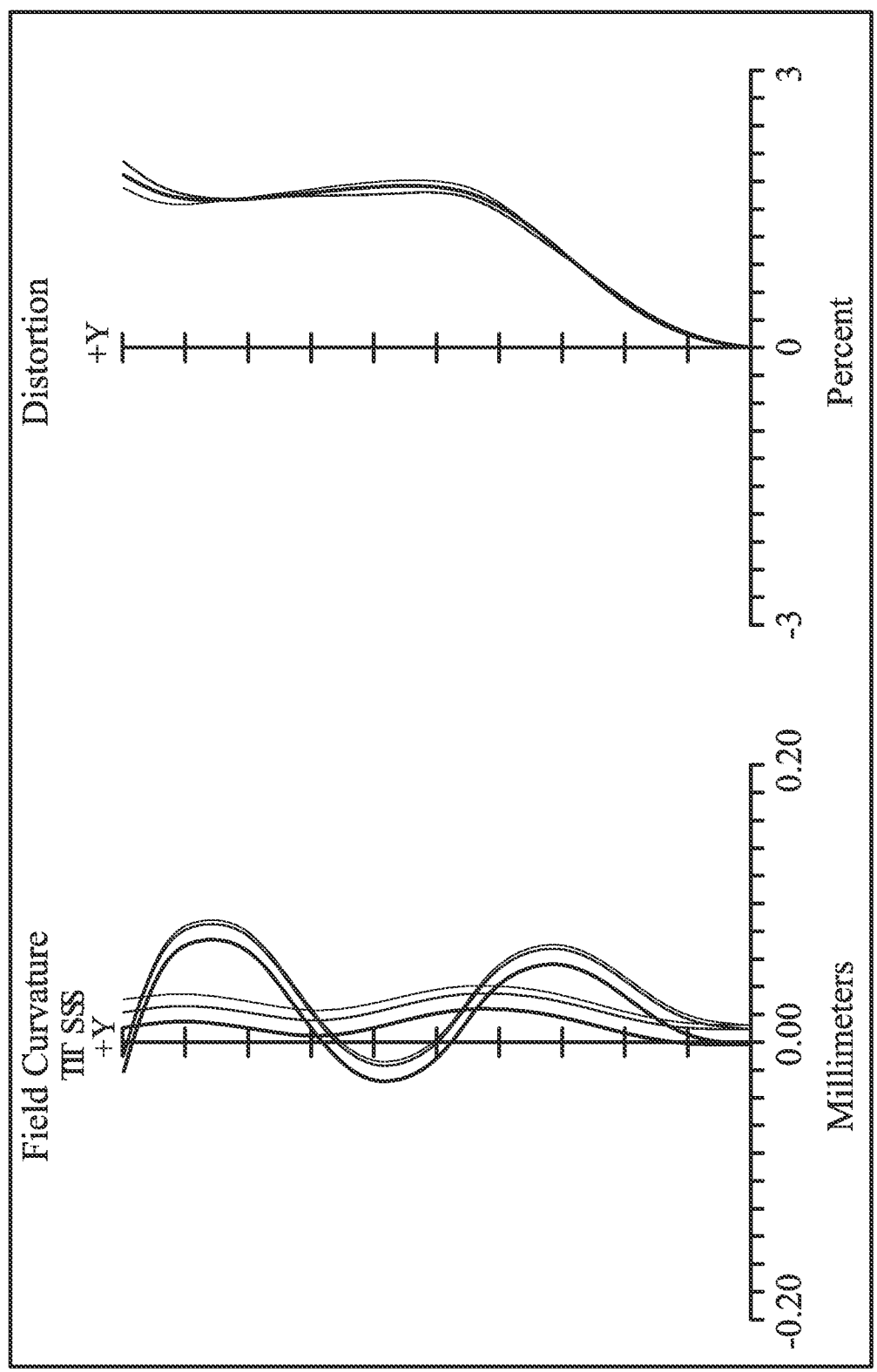
Figure 10A:
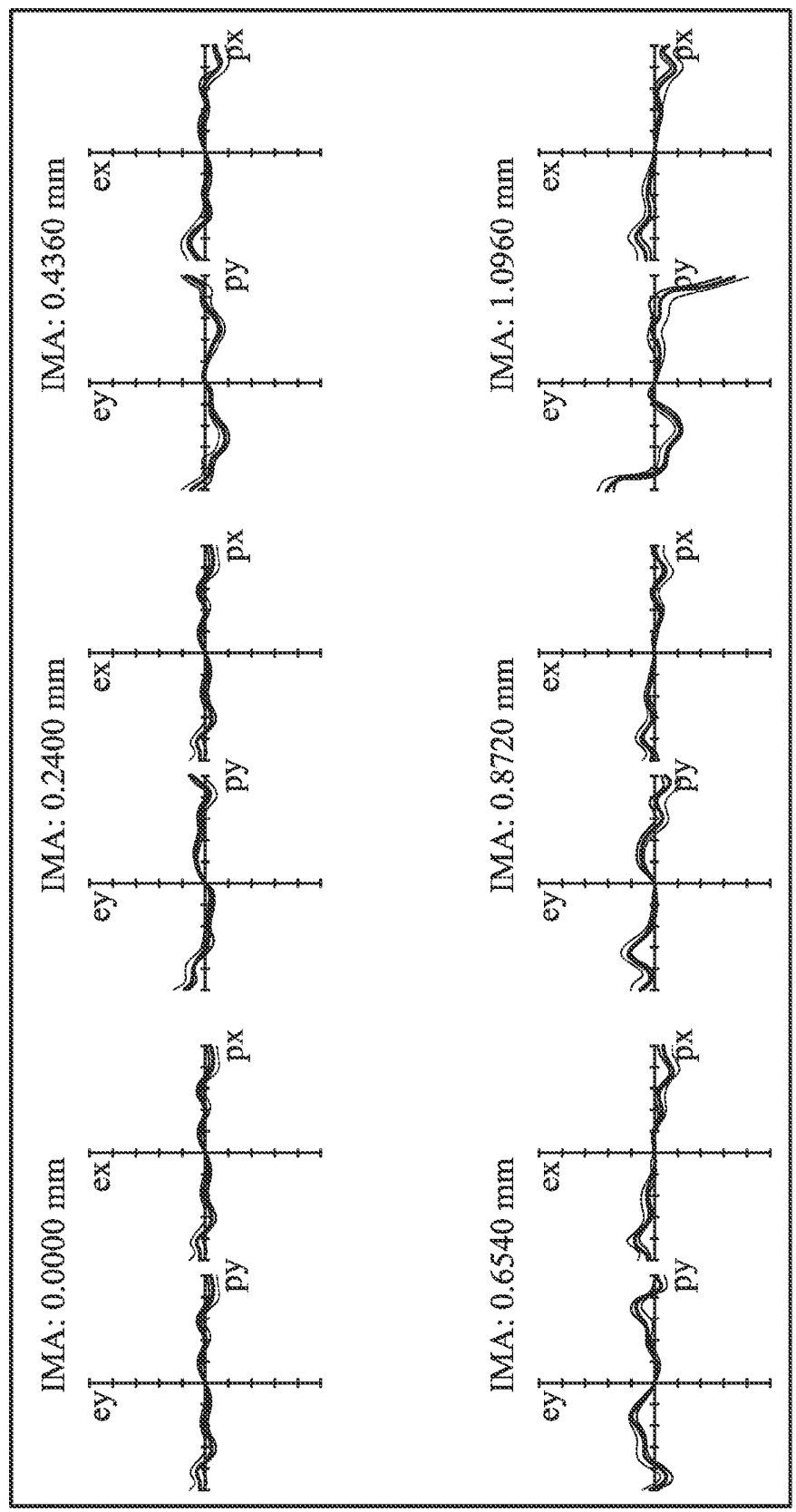
Figure 10B:
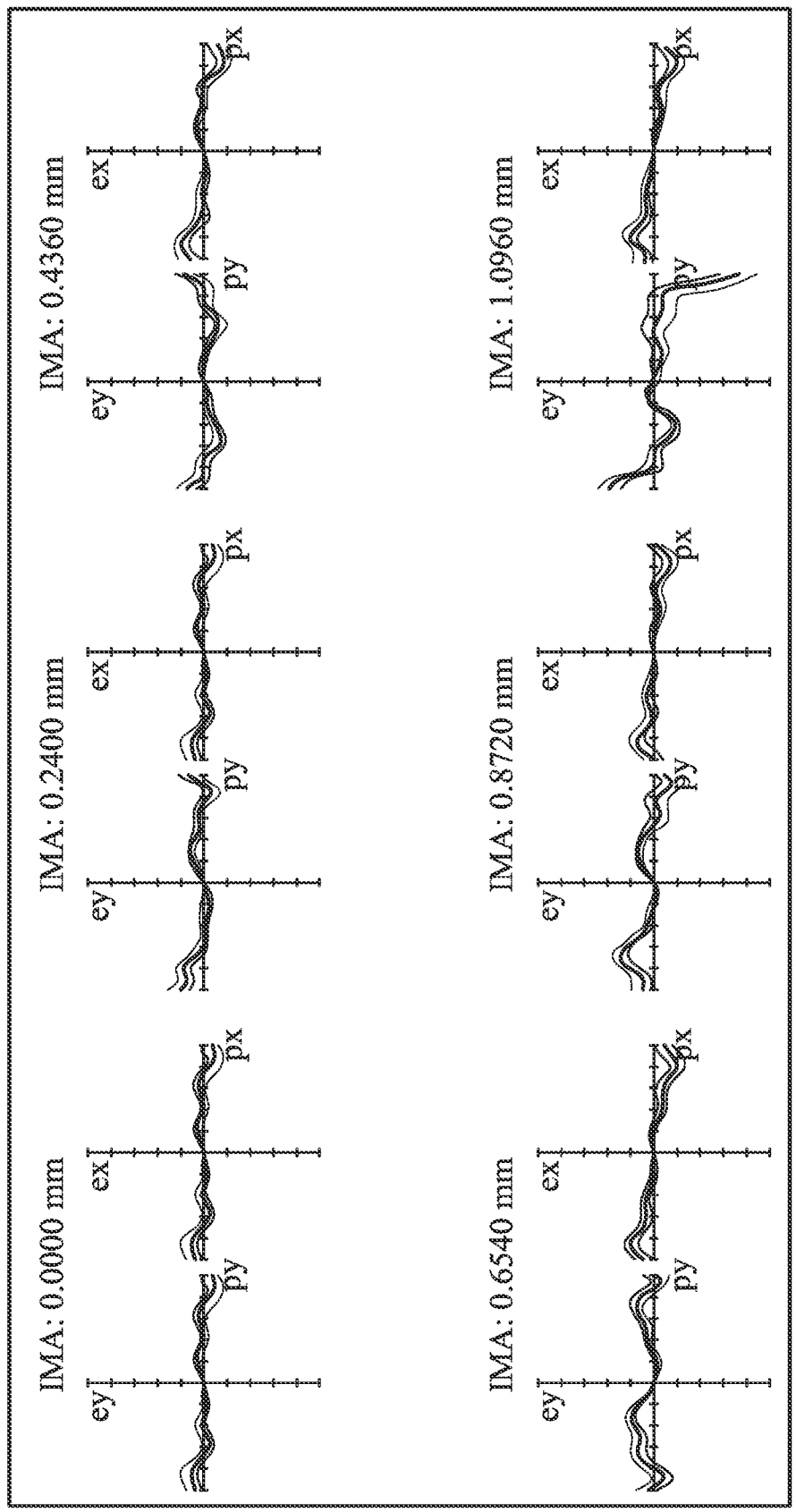
Figure 10C:
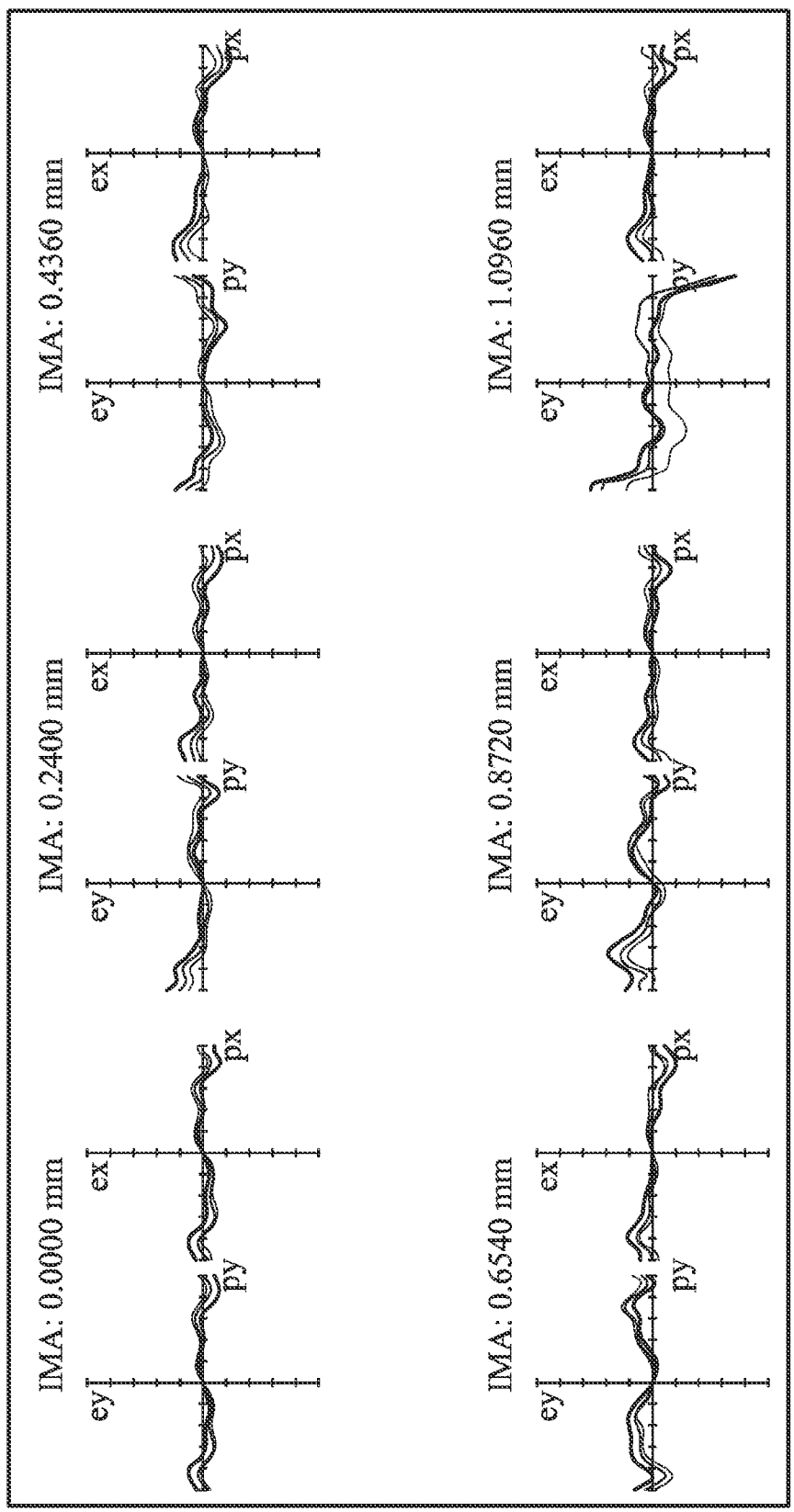

FIGS. 9A-9C and FIGS. 10A-10C are imaging optical simulation data diagrams of the lens array 10 of the fourth embodiment. As shown in FIGS. 9A-9C, the field curvature diagrams and the distortion diagrams respectively correspond to the first micro-lens module L1, the second micro-lens module L2, and the third micro-lens module L3. Specifically, FIG. 9A shows the field curvature and distortion of the first micro-lens module L1 when wavelengths of light respectively located at 650 nm, 610 nm and 570 nm are received by the first micro-lens module L1. FIG. 9B shows the field curvature and distortion of the second micro-lens module L2 when wavelengths of light respectively located at 490 nm, 530 nm and 610 nm are received by the second micro-lens module L2. FIG. 9C shows the field curvature and distortion of the third micro-lens module L3 when wavelengths of light respectively located at 410 nm, 450 nm and 490 nm are received by the third micro-lens module L3. Moreover, as shown in FIGS. 10A-10C, the transverse ray fan plots of images respectively correspond to the first micro-lens module L1, the second micro-lens module L2, and the third micro-lens module L3. According to the above fourth embodiment, the axial aberration of the lens array 10 of the present embodiment can be effectively improved as shown in FIGS. 9A-9C and FIGS. 10A-10C. Furthermore, the difference among the CRA of the first micro-lens module L1, the second micro-lens module L2, and the third micro-lens module L3 is less than ±0.5 degrees, and the difference among the distortions of the first micro-lens module L1, the second micro-lens module L2, and the third micro-lens module L3 is less than ±0.5%. Additionally, the effective focal length of the first lens group (i.e. first lens and second lens) is f1, the effective focal length of the second lens group (i.e. third lens and fourth lens) is f2, and the micro-lens modules also satisfy the following condition: $-0.2<f1/f2<0.5$.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens array, comprising:
a plurality of micro-lens modules, wherein each of the micro-lens modules comprises:
a first lens group; and
a second lens group;
wherein the first lens group and the second lens group are arranged sequentially from an object side to an image side along an optical axis, an effective focal length (EFL) of the first lens group is f1, an EFL of the second lens group is f2, and the micro-lens modules satisfy a following condition: $-0.2<f1/f2<0.5$.

2. The lens array as claimed in claim 1, wherein the first lens group comprises a first lens and a second lens arranged sequentially from the object side to the image side along the optical axis, a surface of the first lens facing the object side is a first aspheric surface, and a surface of the second lens facing the image side is a second aspheric surface.

3. The lens array as claimed in claim 2, wherein the first lens group has positive refractive index.

4. The lens array as claimed in claim 2, wherein the first lens group further comprises a first flat lens disposed between the first lens and the second lens, a reflective index of the first flat lens is between 1.5 and 1.6, and an Abbe number of the first flat lens is between 45 and 65.

5. The lens array as claimed in claim 4, wherein the first lens group further comprises an aperture stop disposed selectively on one plane of the first flat lens.

6. The lens array as claimed in claim 2, wherein the second lens group comprises a third lens and a fourth lens arranged sequentially from the first lens group to the image side along the optical axis, a surface of the third lens facing the object side is a third aspheric surface, and a surface of the fourth lens facing the image side is a fourth aspheric surface.

7. The lens array as claimed in claim 6, wherein the second lens group further comprises a second flat lens disposed between the third lens and the fourth lens, a reflective index of the second flat lens is between 1.5 and 1.6, and an Abbe number of the first flat lens is between 45 and 65.

8. The lens array as claimed in claim 2, wherein the micro-lens modules at least comprise a first micro-lens module and a second micro-lens module, and a radius of curvature of the first aspheric surface of the first micro-lens module is different from a radius of curvature of the first aspheric surface of the second micro-lens module.

9. The lens array as claimed in claim 8, wherein the first micro-lens module is configured to deliver a first light of a first wavelength to an image sensor, the first micro-lens module has a first focal length corresponding to the first light, and the second micro-lens module is configured to deliver a second light of a second wavelength to the image sensor, the second micro-lens module has a second focal length corresponding to the second light, wherein the first wavelength is different from the second wavelength range, and the first focal length is equal to the second focal length.

10. A lens array, comprising:
first and second micro-lens modules, each comprising a first lens group having a first aspheric surface;
wherein a radius of curvature of the first aspheric surface of the first micro-lens module is different from a radius of curvature of the first aspheric surface of the second micro-lens module, wherein the first micro-lens module further comprises a second lens group disposed between the first lens group of the first micro-lens module and an image side, an EFL of the first lens croup of the first micro-lens module is f1, an EFL of the second lens group of the first micro-lens module is f2, and the first micro-lens module satisfies a following condition: $-0.2<f1/f2<0.5$.

11. The lens array as claimed in claim 10, wherein the first micro-lens module is configured to deliver a first light of a first wavelength to an image sensor, the first lens group of the first micro-lens has a first focal length corresponding to the first light, and the second micro-lens module is configured to deliver a second light of a second wavelength to the image sensor, the first lens group of the second micro-lens module has a second focal length corresponding to the second light, wherein the first wavelength is different from the second wavelength, and the first focal length is equal to the second focal length.

12. A lens array, comprising:
first, second and third micro-lens modules, wherein each of the first, second and third micro-lens modules comprises:
a first lens group, having a first aspheric surface; and
a second lens group;
wherein the first lens group and the second lens group are arranged sequentially from an object side to an image side along an optical axis, radiuses of curvature of the first aspheric surfaces of the first, second and third micro-lens modules are different, and the first, second and third micro-lens modules satisfy $-0.2<$(an EFL of the first lens group)/(an EFL of the second lens group)$<0.5$.

13. The lens array as claimed in claim 12, wherein the first micro-lens module is configured to deliver a first light of a first wavelength to an image sensor, the second micro-lens module is configured to deliver a second light of a second wavelength to the image sensor, and the third micro-lens module is configured to deliver a third light of a third wavelength to the image sensor, wherein the first, second and third wavelengths are different.

14. The lens array as claimed in claim 13, wherein the first micro-lens has a first focal length corresponding to the first light, the second micro-lens module has a second focal length corresponding to the second light, and the third micro-lens module has a third focal length corresponding to the third light, wherein the first, second and third focal lengths are equal to each other.

15. The lens array as claimed in claim 13, wherein the first lens group of the first micro-lens has a first focal length corresponding to the first light, the first lens group of the second micro-lens module has a second focal length corresponding to the second light, and the first lens group of the third micro-lens module has a third focal length corresponding to the third light, wherein the first, second and third focal lengths are equal to each other.

16. The lens array as claimed in claim 13, wherein the first wavelength is between 570 nm and 650 nm, the second wavelength is between 490 nm and 570 nm, and the third wavelength is between 410 nm and 490 nm.

17. The lens array as claimed in claim 13, wherein each of the first lens group further comprises:
- a first flat lens disposed between the first aspheric surface and the image side; and
- an aperture stop disposed selectively between the first aspheric surface and the first flat lens or between the first flat lens and the image side.

18. The lens array as claimed in claim 13, wherein the first lens group has positive refractive index.

* * * * *